(12) United States Patent
Kosaka et al.

(10) Patent No.: US 11,253,856 B2
(45) Date of Patent: Feb. 22, 2022

(54) MICROFLUIDIC DEVICE

(71) Applicant: Sharp Life Science (EU) Limited, Oxford (GB)

(72) Inventors: Tomohiro Kosaka, Osaka (JP); Kenichi Kitoh, Osaka (JP); Takeshi Hara, Osaka (JP); Shinya Kadono, Osaka (JP); Fumitoshi Yasuo, Osaka (JP); Manabu Daio, Osaka (JP); Tomoko Teranishi, Osaka (JP); Hao Li, Osaka (JP)

(73) Assignee: Sharp Life Science (EU) Limited, Oxford (GB)

( * ) Notice: Subject to any disclaimer, the term of this patent is extended or adjusted under 35 U.S.C. 154(b) by 229 days.

(21) Appl. No.: 15/705,373

(22) Filed: Sep. 15, 2017

(65) Prior Publication Data

US 2018/0085756 A1 Mar. 29, 2018

(30) Foreign Application Priority Data

Sep. 28, 2016 (JP) .............................. JP2016-190355

(51) Int. Cl.
*B01L 3/00* (2006.01)
*G01N 27/447* (2006.01)

(52) U.S. Cl.
CPC ... *B01L 3/502746* (2013.01); *B01L 3/502715* (2013.01); *B01L 3/502761* (2013.01);
(Continued)

(58) Field of Classification Search
CPC ......... B01L 3/502746; B01L 3/502715; B01L 3/502761; B01L 3/502784;
(Continued)

(56) References Cited

U.S. PATENT DOCUMENTS 7,915,615 B2 * 3/2011 Yamazaki ........... G02F 1/13454
257/59
2003/0132436 A1 * 7/2003 Yamazaki ......... H01L 29/66757
257/59
(Continued)

FOREIGN PATENT DOCUMENTS

JP 2005-148728 6/2005
JP 5345714 8/2013
(Continued)

OTHER PUBLICATIONS

Extended Search Report corresponding to EP Application No. 17193403.
Office Action of JP 2016-190355 dated Sep. 4, 2018.

*Primary Examiner* — Thanh Truc Trinh
(74) *Attorney, Agent, or Firm* — Renner, Otto, Boisselle & Sklar, LLP

(57) ABSTRACT

Provided is a microfluidic device that, as compared with a conventional microfluidic device, (i) is smoother in surface of a water-repellent layer provided above a segment electrode and (ii) makes it easier for microfluid provided in the surface of the water-repellent layer to slide. A microfluidic device (1) includes: an array substrate (10) including a plurality of electrodes (14); and a counter substrate (40) including at least one electrode (42), the array substrate (10) and the counter substrate (40) having therebetween an internal space (50) in which to cause an electroconductive droplet (51) to move across the plurality of electrodes (14), and the plurality of electrodes (14) being provided on a first flattening resin layer (13) and each being a light-blocking metal electrode.

12 Claims, 7 Drawing Sheets

(52) U.S. Cl.
CPC ... *B01L 3/502784* (2013.01); *B01L 3/502792* (2013.01); *G01N 27/44786* (2013.01); *G01N 27/44791* (2013.01); *B01L 2200/06* (2013.01); *B01L 2300/0654* (2013.01); *B01L 2300/0887* (2013.01); *B01L 2300/165* (2013.01); *B01L 2300/168* (2013.01); *B01L 2400/0427* (2013.01)

(58) Field of Classification Search
CPC .......... B01L 3/502792; B01L 2200/06; B01L 2300/0654; B01L 2300/0887; B01L 2300/165; B01L 2300/168; B01L 2400/0427; G01N 27/44786; G01N 27/44791
See application file for complete search history.

(56) References Cited

U.S. PATENT DOCUMENTS

| | | | |
|---|---|---|---|
| 2004/0231987 | A1* | 11/2004 | Sterling .............. B01L 3/50273 204/450 |
| 2009/0283407 | A1 | 11/2009 | Shah et al. |
| 2011/0199564 | A1* | 8/2011 | Moriwaki ......... G02F 1/136227 349/122 |
| 2013/0018611 | A1 | 1/2013 | Sturmer |
| 2014/0299472 | A1 | 10/2014 | Chang et al. |

FOREIGN PATENT DOCUMENTS

| | | |
|---|---|---|
| JP | 2015-531866 | 11/2015 |
| JP | 5960117 | 7/2016 |
| WO | 2010/009463 | 1/2010 |
| WO | 2012/108463 | 8/2012 |

* cited by examiner

MICROFLUIDIC DEVICE

RELATED APPLICATION DATA

This application claims priority to Japanese Application No. 2016-190355, filed on Sep. 28, 2016, which is incorporated herein by reference in its entirety.

TECHNICAL FIELD

The present invention relates to an Electro-wetting on Dielectric (EWOD) microfluidic device for driving microfluid.

BACKGROUND ART

Microfluidics is a field that is being rapidly expanded and relates to operation of a microfluid (e.g. a droplet) having a small volume (e.g., a submicrolitre).

Operation of sn EWOD microfluidic device is generally suitable to sense a location, a size, and a composition of the microfluid. An EWOD microfluidic device for causing movement of microfluid by operating the microfluid is applicable to various measurements of, for example, a coefficient of molecular diffusion, fluid viscosity, pH, a coefficient of chemical bonding, and an enzyme reaction velocity. Other applications for microfluidic devices include capillary electrophoresis, isoelectric focusing, immunoassays, enzymatic assays, flow cytometry, sample injection of proteins for analysis via mass spectrometry, PCR amplification, DNA analysis, cell manipulation, cell separation, cell patterning and chemical gradient formation. Many of these applications have utility for clinical diagnostics.

Thus, a microfluidic device for operating (driving) a droplet by applying an electrical field to the droplet has recently been developed.

An EWOD microfluidic device is generally arranged such that an electroconductive droplet (microfluid) is caught in a water-repellent layer that covers a dielectric layer provided on an electrode. According to the microfluidic device, an electrowetting phenomenon is caused by applying an electrical field to the droplet so as to cause an electric potential difference between the droplet and the electrode, which is directly below the droplet and under the dielectric layer, so that the droplet moves.

Electrowetting is the following phenomenon. Specifically, in a case where an electrical field is applied to a droplet that is located on a dielectric layer which is provided on an electrode and has a water-repellent surface, surface energy of the dielectric layer is changed as much as electrostatic energy of a capacitor that is formed between the electrode and the droplet, so that energy of a solid-liquid interface is changed, and a contact angle of the droplet with respect to a dielectric film surface is changed.

For example, Patent Literature 1 and Patent Literature 2 each disclose, as a microfluidic device, an active matrix electrowetting-on-dielectric (AM-EWOD) device for operating (carrying out electrowetting-on-dielectric (EWOD) with respect to) a droplet that is located on an active matrix array in which segment electrodes are provided in a matrix pattern. The term "segment electrodes" is used throughout to refer to multiple electrodes, separated from each other by a gap and arranged in an array (matrix). In a typical AM-EWOD device configuration the electrodes are each independently driven by voltage signals in order to implement electrowetting, the voltage signals being provided being controlled by thin film transistors (TFTs).

According to an AM-EWOD device, electrowetting is carried out by using, as an active element, a thin film transistor (TFT), for example.

An AM-EWOD device includes a plurality of electrodes (segment electrodes) provided in a matrix pattern. To the respective plurality of electrodes, TFTs are electrically connected. The TFTs are used to control the respective plurality of electrodes, which is electrically connected thereto.

Each of the plurality of electrodes is generally made of a transparent metal oxide, for example indium tin oxide (ITO) (see, for example, Patent Literature 2).

CITATION LIST

Patent Literatures

[Patent Literature 1]
Japanese Patent No. 5345714 (Registration Date: Aug. 23, 2013)
[Patent Literature 2]
Japanese Patent No. 5960117 (Registration Date: Jul. 1, 2016)

SUMMARY OF INVENTION

Technical Problem

Note, however, that an electrode made of ITO commonly has topographical unevenness, with the extent of flatness variation depending on how the electrode is produced.

FIG. 7 is a cross-sectional view schematically illustrating (i) an example arrangement of a main part of an AM-EWOD device 300 including segment electrodes made of an ITO and (ii) a problem of the AM-EWOD device 300.

The following description takes, as an example, the AM-EWOD device 300 shown in FIG. 7, and discusses a problem of a microfluidic device in which electrodes 314 each made of an ITO are used as the segment electrodes.

According to the AM-EWOD device 300, water repellency of a water-repellent layer 318 that is provided on a dielectric layer 316 which is provided on the electrodes 314 and serves as an ion barrier layer is controlled by applying an electrowetting drive voltage to each of the electrodes 314.

A droplet 51 moves toward a more hydrophilic region (i.e., a less hydrophobic region). Thus, in a case where electrowetting drive voltages that differ from each other are applied to respective adjacent electrodes 314 (shown by 314a and 314b in FIG. 7), the droplet 51 can move across the plurality of electrodes 314 and along a surface of the water-repellent layer 318.

The droplet 51 moves along the water-repellent layer 318 so as to slide. Note, however, that study by the inventors of the present invention reveals the following. Specifically, as shown in FIG. 7, in a case where surfaces of the electrodes 314 are provided with many pieces of unevenness, a surface of the dielectric layer 316, which is a layer provided on the electrodes 314, is also provided with many pieces of unevenness, and further, an outermost surface of the water-repellent layer 318, which is a layer provided on the dielectric layer 316, is also provided with many pieces of unevenness.

As described earlier, evenness of the surface of the water-repellent layer 318 follows evenness of the surface of the dielectric layer 316, which serves as a base for the water-repellent layer 318, and evenness of the surface of the dielectric layer 316 follows evenness of the surfaces of the electrodes 314, which serve as a base for the dielectric layer 316.

In a case where the surface of the water-repellent layer 318 is provided with many pieces of unevenness, fluid friction easily occurs in an interface between the water-repellent layer 318 and the droplet 51. As a result, the movement of the droplet 51 may be stopped halfway as shown in a cross in FIG. 7. This prevents the droplet 51 from moving as intended.

Further, unevenness of the dielectric layer 316, which serves as the base for the water-repellent layer 318, also serves as resistance (fluid friction) against the droplet 51 which is moving, and consequently prevents the droplet 51 from moving.

This may cause the following problem. Specifically, as shown by two-dot chain lines in FIG. 7, even in a case where the droplet 51 moves, the droplet 51 partially may remain on a path through which the droplet 51 moves, and the droplet 51 may be separated into a plurality of droplets (two droplets 51a and 51b in the example shown in FIG. 7).

As described earlier, unevenness of the surface of the water-repellent layer 318, which unevenness is derived from unevenness of the surfaces of the electrodes 314, greatly affects electrowetting performance. Achievement of high water repellency that is necessary for a microfluidic device requires the water-repellent layer 318 which is even and dense.

Further, easiness of sliding (easiness of movement) of the droplet 51 along the water-repellent layer 318, which is provided above the electrodes 314, varies depending on a magnitude of a voltage to be applied to each of the electrodes 314. In a case where a higher voltage is applied to each of the electrodes 314, the droplet 51 more easily slides. Note, however, that a voltage that is as low as possible is desirably applied to each of the electrodes 314 in view of (i) voltage resistance of TFTs 20 that are electrically connected to the respective electrodes 314 and (ii) voltage resistance of the dielectric layer 316.

As in an AM-EWOD device, an electrowetting display in which electrowetting is employed includes, as pixel electrodes, a plurality of segment electrodes that is electrically connected to respective TFTs and is provided in a matrix pattern. Note, however, that a droplet that is used in an electrowetting display in which electrowetting is employed is smaller than a droplet that is used in a microfluidic device, and the electrowetting display has an internal space that is divided into a plurality of cells. The plurality of cells is separated by pixel separation walls, provided in a lattice pattern, for preventing leakage of the droplet into adjacent pixels, and the plurality of segment electrodes is provided in the respective plurality of cells.

Thus, to each of segment electrodes, a voltage of, for example, approximately 16 V is applied according to the electrowetting display, whereas a voltage of approximately 20 V, which is higher than the voltage applied in the case of the electrowetting display, needs to be applied according to the microfluidic device. Therefore, the microfluidic device, which causes the droplet to move across the segment electrodes, needs to be more resistant to a voltage than the electrowetting display.

Consequently, in order to apply a lower voltage to each of the electrodes 314 of the microfluidic device, it is extremely important to allow the droplet 51 to more easily slide along the water-repellent layer 318, which is provided above the electrodes 314.

The present invention has been made in view of the problems, and an object of the present invention is to provide a microfluidic device that, as compared with a conventional microfluidic device, (i) is smoother in surface of a water-repellent layer provided above a segment electrode and (ii) makes it easier for microfluid to move.

Solution to Problem

In order to attain the object, a microfluidic device in accordance with an aspect of the present invention includes: (I) a first substrate; and (II) a second substrate provided so as to face the first substrate, the first substrate including: a plurality of first electrodes; a plurality of drive elements, electrically connected to the respective plurality of first electrodes, for driving the respective plurality of first electrodes; a first flattening resin layer that covers the plurality of drive elements; a dielectric layer that covers the plurality of first electrodes; and a first water-repellent layer that covers the dielectric layer, the second substrate including: at least one second electrode provided so as to face the plurality of first electrodes; and a second water-repellent layer that covers the at least one second electrode, the first substrate and the second substrate having therebetween an internal space in which to cause electroconductive microfluid to move across the plurality of first electrodes, and the plurality of first electrodes being provided on the first flattening resin layer and each being a light-blocking metal electrode.

Advantageous Effects of Invention

As a result of diligent study, the inventors of the present invention found that the reason why movement of microfluid is prevented and a voltage that is applied to a segment electrode so that the microfluid moves is made higher is eventually due to unevenness of a surface of the segment electrode. Then, the inventors of the present invention found that according to a microfluidic device, totally different from an electrowetting display, for causing microfluid to move across a plurality of electrodes (i.e., segment electrodes), in causing the microfluid to smoothly move, it is important that a water-repellent layer along which to cause the microfluid to slide should have an even surface, and it is particularly important that the water-repellent layer which is provided above the segment electrodes should be more even. Subsequently, the inventors of the present invention found (i) that in order that the water-repellent layer which is provided above the segment electrodes is more even, it is important that the segment electrodes should have more even surfaces and (ii) that the plurality of first electrodes can have evermore even surfaces in a case where the plurality of first electrodes, which serves as the segment electrodes, is provided on the first flattening resin layer and is made of light-blocking metal electrodes. Finally, the inventors of the present invention accomplished the present invention.

The aspect makes it possible to provide a microfluidic device that, as compared with a conventional microfluidic device, (i) is smoother in surface of a water-repellent layer provided above a segment electrode and (ii) makes it easier for microfluid to move.

DESCRIPTION OF EMBODIMENTS

Figure 1:
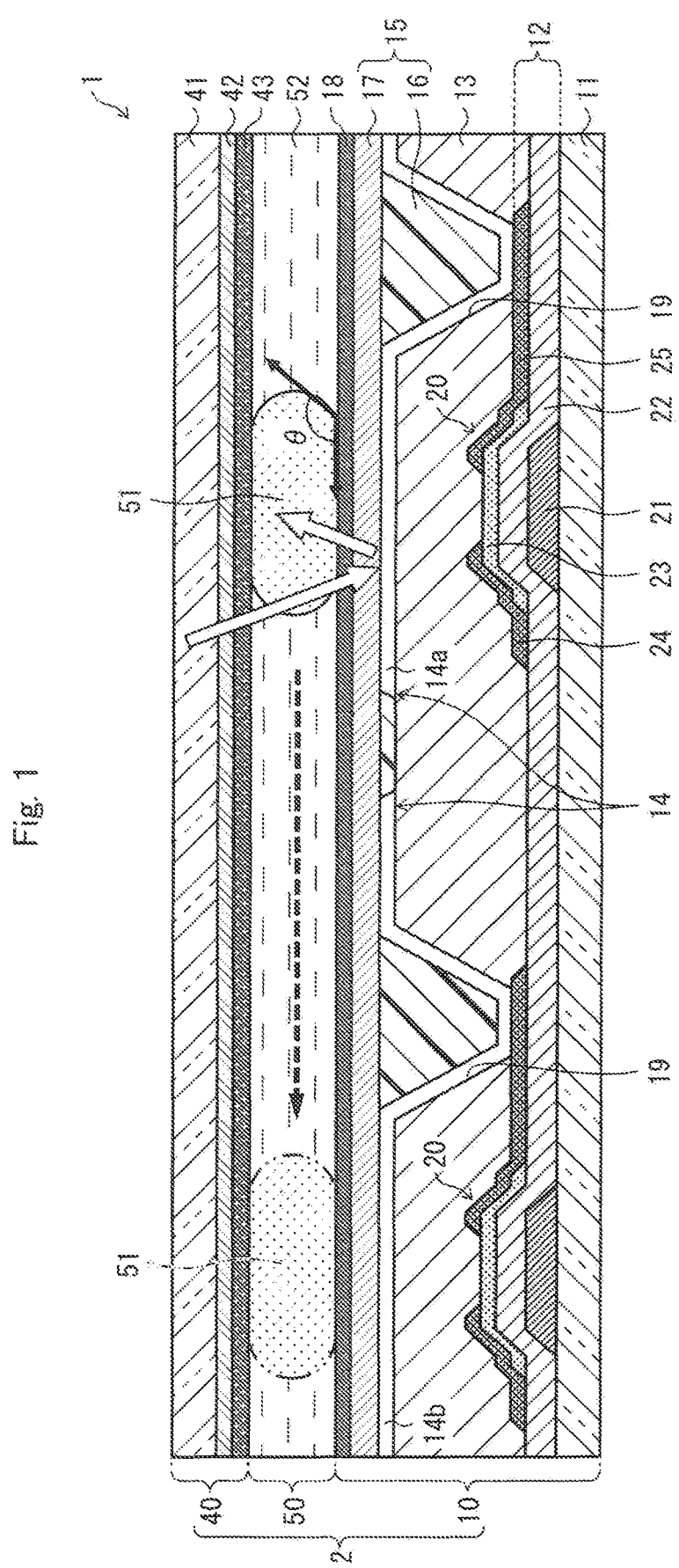
FIG. 1 is a cross-sectional view schematically illustrating an example arrangement of a main part of a microfluidic device in accordance with Embodiment 1 of the present invention.

An embodiment of the present invention is specifically described below.

Embodiment 1

An embodiment of the present invention is as described below with reference to FIGS. 1 through 3.

The description of Embodiment 1 takes, as an example of a microfluidic device in accordance with Embodiment 1, an active matrix electrowetting-on-dielectric (AM-EWOD) device including segment electrodes provided in a matrix pattern. In the following description, for convenience, members having functions identical to those of the respective members described in Background Art are given respective identical reference numerals.

<Schematic Arrangement of Microfluidic Device 1>

FIG. 1 is a cross-sectional view schematically illustrating an example arrangement of a main part of a microfluidic device 1 in accordance with Embodiment 1. FIG. 2 is a plan view schematically illustrating an example arrangement of a thin film electronic circuit layer 12 of the microfluidic device 1 in accordance with Embodiment 1.

Figure 2:
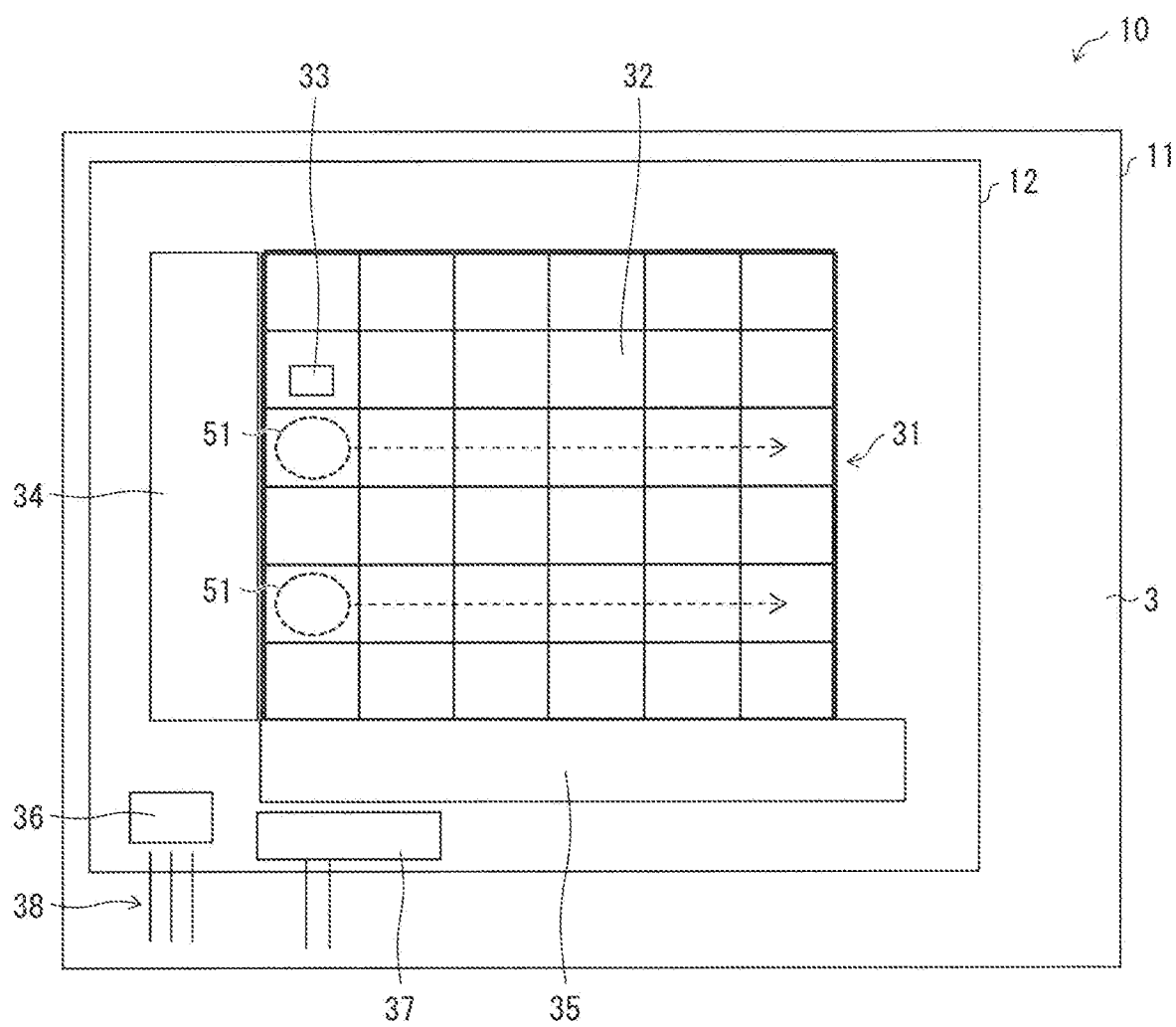
FIG. 2 is a plan view schematically illustrating an example arrangement of a thin film electronic circuit of the microfluidic device in accordance with Embodiment 1 of the present invention.

As illustrated in FIGS. 1 and 2, the microfluidic device 1 in accordance with Embodiment 1 includes a pair of substrates, which are provided so as to face each other and which are an array substrate 10 (first substrate) and a counter substrate 40 (second substrate), respectively.

The array substrate 10 and the counter substrate 40 are combined together, so as to have a given gap (cell gap) therebetween, by use of a sealing material (not illustrated) provided in outer edges of respective surfaces of the array substrate 10 and the counter substrate 40 which surfaces face each other (in the example shown in FIG. 2, an outer edge of the counter substrate 40, for example). Note that the array substrate 10 and the counter substrate 40 can be combined together via a wall formed in the outer edges of the respective surfaces of the array substrate 10 and the counter substrate 40 which surfaces face each other.

This causes the microfluidic device 1 to include, as a main body of the microfluidic device, a single large cell 2 including the array substrate 10 and the counter substrate 40 which are combined together.

An internal space 50 that is formed in the cell 2 by the gap between the array substrate 10 and the counter substrate 40 is used as a minute path (micro path) through which to cause a droplet 51 (microfluid) to move.

The cell 2 is provided with at least an opening (not illustrated) via which to pour fluid (e.g., the droplet 51) into the cell 2.

For example, in the example shown in FIG. 2, the array substrate 10 is provided so as to be larger than the counter substrate 40. This causes the array substrate 10 to have an extended part 3 that more externally protrudes than the counter substrate 40 in plan view while facing the counter substrate 40.

The cell 2 has side walls made of, for example, the wall or the sealing material, and the side walls are partially provided with an opening (not illustrated) which faces the extended part 3 and through which the fluid (e.g., the droplet 51) passes. The opening can be used to pour the fluid (e.g., the droplet 51) into the cell 2 and to take out the fluid (e.g., the droplet 51) from an inside to an outside of the cell 2.

Note, however, that Embodiment 1 is not limited to the above arrangement. For example, the counter substrate 40 can be provided with the opening. Alternatively, the array substrate 10 and the counter substrate 40 can be, for example, identical in size.

As illustrated in FIG. 2, the microfluidic device 1 in accordance with Embodiment 1 includes an electrode array 31 including a plurality of array elements 32. The plurality of array elements 32 is arranged to operate one or more droplets 51 provided in the electrode array 31.

The microfluidic device 1 in accordance with Embodiment 1 is an AM-EWOD device as described earlier. As illustrated in FIG. 2, the electrode array 31 includes M×N array elements 32 provided in a matrix pattern. Note here that M and N can each be any numerical value. Note that M and N are each typically, for example, not less than 2.

The array elements 32 include respective electrodes 14 (e.g., electrodes 14a and 14b, first electrodes) provided in the array substrate 10 and an electrode 42 (second electrode) provided in the counter substrate 40, the electrodes 14 and the electrode 42 each being illustrated in FIG. 1. The electrodes 14 are each a segment electrode and are independently subjected to drive control. The array elements 32 include respective array element circuits 33 so as to control an electric potential of a corresponding electrode 14.

It is possible to locate one or more droplets 51 in a space of the cell 2 between the electrodes 14 and the electrode 42. The array element circuits 33 are arranged to supply drive signals to the electrodes 14 and the electrode 42 of the respective plurality of array elements 32 so as to operate the one or more droplets 51 among the plurality of array elements 32.

(Array Substrate 10)

The array substrate 10 illustrated in FIG. 1 is an active matrix TFT substrate including a plurality of TFTs 20 that is provided in a matrix pattern so as to serve as drive elements.

The array substrate 10 is used as an AM-EWOD substrate for carrying out droplet drive (EWOD) in an active matrix arrangement.

An AM-EWOD substrate to which an electronic circuit in which a TFT 20 is used is applied has an advantage of allowing drive circuits to be integrated thereon. Further, an electronic circuit in which the TFT 20 is thus used is suitably applied to AM-EWOD.

As illustrated in FIG. 1, the array substrate 10 is arranged to include: the thin film electronic circuit layer 12, which (i) is provided on an insulating substrate 11, which is a supporting substrate, and (ii) includes the plurality of TFTs 20; a first flattening resin layer 13, which is provided on the thin film electronic circuit layer 12; the plurality of electrodes 14, which is provided on the first flattening resin layer 13 and each of which is an EW drive element electrode; a dielectric layer 15, which is provided on the plurality of electrodes 14 and includes a second flattening resin layer 16 and an ion barrier layer 17; and a water-repellent layer 18, which is provided on the dielectric layer 15.

Note that FIG. 1 shows an example in which the water-repellent layer 18 is provided on a side (active side) of the insulating substrate 11 on which side the plurality of electrodes 14 is provided. Note, however, that an arrangement of the array substrate 10 is not limited to the arrangement described earlier. The array substrate 10 can also be arranged such that all surfaces thereof are covered with the water-repellent layer 18.

The thin film electronic circuit layer 12 is a circuit layer including the plurality of TFTs 20 (see FIGS. 1 and 2), and is arranged to drive the plurality of electrodes 14.

On the insulating substrate 11, a plurality of gate wires (not illustrated) connected to the plurality of TFTs 20 and a plurality of source wires (not illustrated) connected to the plurality of TFTs 20 are provided as wires so as to intersect at right angles. For example, each of the plurality of TFTs 20 is provided at a corresponding intersection of a gate wire and a source wire.

For example, as illustrated in FIG. 1, a TFT 20 has a structure in which a gate electrode 21, a gate insulating film 22, a semiconductor layer 23 (an n+ layer and an i layer), a source electrode 24 provided in contact with the n+ layer of the semiconductor layer 23, and a drain electrode 25 are provided on the insulating substrate 11 in this order.

The thin film electronic circuit layer 12 includes the TFTs 20 and the gate insulating film 22, which constitutes part of the TFTs 20.

Note that an arrangement of the microfluidic device 1 in accordance with Embodiment 1 is not limited to the above arrangement. FIG. 1 shows an example in which a TFT 20 is a bottom gate (inversely staggered) TFT. Note, however, that the TFT 20 can also be a top gate (staggered) TFT.

That is, the TFT 20 can also have a structure in which the semiconductor layer 23, the gate insulating film 22, the gate electrode 21, an interlayer insulating film that covers the gate electrode 21, the source electrode 24 and the drain electrode 25 each of which is connected to the semiconductor layer 23 via the interlayer insulating film are provided on the insulating substrate 11 in this order. Consequently, the thin film electronic circuit layer 12 can further include the interlayer insulating film.

As illustrated in FIG. 2, the thin film electronic circuit layer 12 further includes a row drive circuit 34 and a column drive circuit 35, which are integrated thereon. The row drive circuit 34 and the column drive circuit 35 supply control signals to the array element circuits 33. The row drive circuit 34 and the column drive circuit 35 can be mounted as thin film electronic components and can be used to supply the control signals to part or all of the array element circuits 33.

The thin film electronic circuit layer 12 can include a serial interface 36 that processes serially inputted streams of data and writes a necessary voltage into the electrode array 31. The thin film electronic circuit layer 12 can also include a voltage supply interface 37 that supplies a voltage to be supplied to each of the electrodes 14, a drive voltage of the electrode 42 of the counter substrate 40, and other required voltage(s). The thin film electronic circuit layer 12 which includes the serial interface 36 and/or the voltage supply interface 37 allows the number of connecting wires 38 provided so as to connect the array substrate 10 and an external drive electronic circuit (not illustrated) and the number of, for example, power supplies to be made relatively smaller even in a case where the electrode array 31 has a large size.

Each of the array element circuits 33 can additionally have a sensor function. For example, an array element circuit 33 can include a mechanism for (i) detecting that a droplet 51 is present at a place in the electrode array 31 at which place each of the array elements 32 is provided and (ii) detecting a size of the droplet 51.

In view of the above, the thin film electronic circuit layer 12 can include a column detection circuit (not illustrated) for reading sensor data from each of the array elements 32 and integrating the data into one or more serial output signals. The serial output signals can be given via the serial interface 36 and supplied from the microfluidic device 1 via one or more connecting wires 38.

The array element circuit 33 is arranged to be capable of applying a given droplet drive voltage to the droplet 51 and can include, for example, a memory element (not illustrated) and/or an inverting circuit (not illustrated). The memory element can include, for example, column writing lines extending from the column drive circuit 35 (the column writing lines can be shared by array elements arranged in a single column), row selection lines extending from the row drive circuit 34 (the row selection lines can be shared by array elements arranged in a single row), a capacitor storage, a direct current (DC) supply voltage, and a switch transistor.

As illustrated in FIG. 1, the first flattening resin layer 13 for smoothing unevenness of a surface of the thin film electronic circuit layer 12, which includes the TFTs 20, is provided on the thin film electronic circuit layer 12 so as to cover the TFTs 20. The first flattening resin layer 13 is provided with a plurality of contact holes 19 via each of which to connect a corresponding electrode 14 and the drain electrode 25 of a corresponding TFT 20.

On the first flattening resin layer 13, the plurality of electrodes 14 is provided in a matrix pattern. The plurality of electrodes 14, each of which is an active matrix (AM) electrode (array element electrode), constitutes part of the electrode array 31 illustrated in FIG. 2. As illustrated in FIG. 1, each of the plurality of electrodes 14 is electrically connected to the drain electrode 25 of a corresponding TFT 20 via a corresponding contact hole 19.

Note that it is also possible to understand that the plurality of electrodes 14, which is connected to the thin film electronic circuit layer 12 via the respective TFTs 20, is a part of a layer constituting the thin film electronic circuit layer 12. Such an arrangement is referred to as an electrowetting drive element. That is, it is also possible to understand that the thin film electronic circuit layer 12 includes the TFTs 20, the first flattening resin layer 13, and the plurality of electrodes 14.

Note that the electrowetting drive element can be an electrode 14 that is associated with a specific array element 32, or can be a node of an electronic circuit that is directly connected to the electrode 14. Alternatively, the electrowetting drive element may refer to both an electrode 14 that is associated with a specific array element 32 and a node of an electronic circuit that is directly connected to the electrode 14.

On the first flattening resin layer 13, the dielectric layer 15 is provided so as to cover the plurality of electrodes 14. The dielectric layer 15 in accordance with Embodiment 1 includes the second flattening resin layer 16 and the ion barrier layer 17, which is made of an inorganic film. The second flattening resin layer 16 and the ion barrier layer 17 separate the electrodes 14 from the water-repellent layer 18, which is provided on a surface, facing the counter substrate 40, of the array substrate 10.

As illustrated in FIG. 1, the contact holes 19 are desirably filled with the second flattening resin layer 16.

According to Embodiment 1, the second flattening resin layer 16 is provided only in the contact holes 19, and no second flattening resin layer 16 is provided on the electrodes 14. For example, the second flattening resin layer 16 is provided so that a surface thereof is flush with surfaces, except surfaces located in the contact holes 19, of the electrodes 14.

Top surfaces of the second flattening resin layer 16 which top surfaces are provided in the respective contact holes 19 are covered with the ion barrier layer 17. On the electrodes 14, excluding a place therein in which the contact holes 19 are provided, only the ion barrier layer 17 is provided as the dielectric layer 15.

As described earlier, according to Embodiment 1, the unevenness of the surface of the thin film electronic circuit layer 12, which includes the TFTs 20, the unevenness facing the internal space 50, which causes the droplet 51 to move, is smoothed by the first flattening resin layer 13, and a level difference (depression, recess), which is caused by a contact hole 19 and faces the internal space 50, and a level difference (depression, recess) between adjacent electrodes 14, which level difference faces the internal space 50, are removed by the second flattening resin layer 16. With the arrangement, unevenness of the surface of the array substrate 10, which unevenness develops in the internal space 50 and is derived from provision of the TFTs 20 and the electrodes 14, is smoothed.

Note that Embodiment 1 shows, with reference to the drawings, an example in which the second flattening resin layer 16 is provided in the contact holes 19 and in spaces between adjacent electrodes 14. Note, however, that the second flattening resin layer 16 does not necessarily need to be provided in the contact holes 19 and in the spaces between adjacent electrodes 14 in a case where the droplet 51 is sufficiently larger than each of the electrodes 14.

Note, however, that the electrodes 14, which are provided on the first flattening resin layer 13, cause the contact holes 19 to have a height of, for example, approximately 2 μm. Thus, the water-repellent layer 18 which is even and dense can be formed in a case where the second flattening resin layer 16 fills at least (a) the contact holes 19 of (a) the contact holes 19 and (b) the spaces between adjacent electrodes 14.

Note that an electrode 14 has a thickness of, for example, 50 nm to 100 nm, and a level difference caused by adjacent electrodes 14 is much smaller than the height of the contact holes 19. Thus, a level difference between adjacent electrodes 14 is not critical. However, even in a case where a level difference between adjacent electrodes 14 is slight, repeated operation of back-and-forth movement of the droplet 51 in such a level difference may affect electrowetting performance by, for example, causing the water-repellent layer 18 to peel off at a corner of an electrode 14. Thus, since the level difference between adjacent electrodes 14 can be removed by filling not only the contact holes 19 but also the spaces between adjacent electrodes 14 with the second flattening resin layer 16, such a problem as described above can be prevented from arising, so that greater reliability can be achieved.

The ion barrier layer 17 is a layer that prevents transmission therethrough of ions contained in the droplet 51. The ion barrier layer 17 is provided on a set of the first flattening resin layer 13, the electrodes 14, and the second flattening resin layer 16 so as to cover the first flattening resin layer 13, the electrodes 14, and the second flattening resin layer 16.

On the ion barrier layer 17, which has an even surface, the water-repellent layer 18 is provided so as to have a uniform thickness and cover an entirety of the surface, facing the counter substrate 40, of the array substrate 10.

(Counter Substrate 40)

As illustrated in FIG. 1, the counter substrate 40 includes, as a counter electrode (common electrode), the electrode 42, which is provided on a surface, facing the array substrate 10, of an insulating substrate 41, which is a supporting substrate.

The electrode 42 is provided so as to be solid, for example. Typically, the electrode 42 is shared by all the array elements 32. Note, however, that each of the array elements 32 or a group of the plurality of array elements 32 can include the electrode 42 which is unique.

The electrode 42 is covered with a water-repellent layer 43. The water-repellent layer 43 is provided, on an entirety of a surface, facing the array substrate 10, of the counter substrate 40, so as to be solid.

(Internal Space 50)

The internal space 50 which is surrounded by the array substrate 10, the counter substrate 40, and the sealing material (not illustrated) is provided in the gap between the array substrate 10 and the counter substrate 40.

In the internal space 50, the droplet 51 which is electroconductive is bound. The droplet 51 contains, for example, an ionic liquid, and a space in the internal space 50 which space is not occupied by the droplet 51 can be filled with a nonionic liquid 52 which is not miscible with the droplet 51 and is nonelectroconductive.

Examples of a liquid that can be used for the droplet 51 comprise any polar liquid, and for example encompass water, an electrolyte solution (aqueous electrolyte solution), alcohols, and various ionic liquids. The droplet 51, which is not particularly limited, can be any liquid provided that the liquid can be operated by electrowetting. Examples of the droplet 51 encompass water, a whole blood sample, bacterial cell suspension, protein or antibody solution, bovine serum albumin (BSA) solution, buffer solution e.g. plasma buffer solution (PBS), enzymatic solutions, salt solutions containing cells, DNA or RNA fragments, solutions containing reagents used in standard biochemical assays including immunoassays, etc.

The nonionic liquid 52 should be non-polar and not miscible with the droplet 51. As the nonionic liquid 52, a liquid that has lower surface tension than the droplet 51 is generally used. Examples of the nonionic liquid 52 encompass hydrocarbon-based solvents such as a decane solvent, a dodecane solvent, a hexadecane solvent, and an undecane solvent (low molecular hydrocarbon-based solvents), oils such as a silicone oil, and fluorocarbon-based solvents. Examples of the silicone oil encompass dimethylpolysiloxane. Note that as the nonionic liquid 52, only one kind selected from the above liquids can be used, or two or more kinds selected from the above liquids can be appropriately used in combination.

For example, a liquid that has lower specific gravity than the droplet 51 is selected for the nonionic liquid 52. The droplet 51 which is an aqueous electrolyte solution has specific gravity ($\approx 1.0$) that is substantially equal to specific gravity of water. In this case, a liquid that has specific gravity of less than 1.0 (e.g., a silicone oil) is used for the nonionic liquid 52.

The droplet 51 and the nonionic liquid 52 each preferably have a low viscosity. In order to have a given viscosity, the droplet 51 can be adjusted by being diluted with, for example, water.

<Driving of Droplet 51>

In a case where a surface of the water-repellent layer 18 is in contact with the droplet 51 and gas (or the nonionic liquid 52), the droplet 51 is provided at a contact angle θ, which is an angle formed between a surface of the droplet 51 and the surface of the water-repellent layer 18 on a boundary line on which three phases, which are (i) the surface of the water-repellent layer 18, (ii) the droplet 51, and (iii) the gas (or the nonionic liquid 52), are in contact with one another.

The contact angle θ formed between the droplet 51 and the water-repellent layer 18 is changed by applying an electrical field to the droplet 51. This is because the application of an electrical field to the droplet 51 changes surface energy of the dielectric layer 15 as much as electrostatic energy of a capacitor formed between the electrodes 14 and the droplet 51, so that surface tension (interface energy) between the water-repellent layer 18 and the droplet 51 is changed.

Note that the contact angle θ is a criterion for determining hydrophobicity of the surface of the water-repellent layer 18. It can be determined that the surface of the water-repellent layer 18 is hydrophilic in a case where θ<90° and that the surface of the water-repellent layer 18 is hydrophobic in a case where θ>90°. Then, in accordance with a difference between the contact angle θ and 90°, it is determined to what degree the surface of the water-repellent layer 18 is hydrophobic or hydrophilic.

During driving of the microfluidic device 1, in a case where different voltages (electrowetting drive voltages) are applied to respective different electrodes 14 (e.g., electrodes 14a and 14b), hydrophobicity (water repellency) of the water-repellent layers 18 and 43 are effectively controlled by an electrical force produced by such voltage application. Thus, for example, in a case where different electrodes (the electrodes 14a and 14b) are provided so that different electrowetting drive voltages are applied to the respective different electrodes, the droplet 51 is allowed to move along the surface of the water-repellent layer 18 in the internal space 50. The droplet 51 moves toward a more hydrophilic region (i.e., a less hydrophobic region).

Specifically, to the electrode 42, a high (Hi) level voltage is applied at all times. This causes the water-repellent layer 43, which is provided on the electrode 42, to be hydrophobic at all times. In view of this, wettability above the electrodes 14 is sloped by switching between hydrophobicity and hydrophilicity of the water-repellent layer 43 by switching, between a high (Hi) level voltage and a low (Lo) level voltage, voltages to be applied to respective adjacent electrodes 14a and 14b.

For example, in a case where the droplet 51 illustrated in FIG. 1 is caused to move in the internal space 50 as shown by an arrow in FIG. 1, and a voltage of the electrode 14a is set as a high (Hi) voltage, whereas a voltage of the electrode 14b, which is adjacent to the electrode 14a, is set as a low (Lo) voltage, a first region of the water-repellent layer 18 which first region is located above the electrode 14a is made hydrophobic, whereas a second region of the water-repellent layer 18 which second region is located above the electrode 14b is made hydrophilic. This causes the droplet 51 which is present in the first region of the water-repellent layer 18 which first region is located above the electrode 14a to move to the second region of the water-repellent layer 18 which second region is located above the electrode 14b.

Movement of the droplet 51 can thus be controlled in a case where a Lo voltage is applied to a first electrode 14 above which a region to which the droplet 51 is desired to move is located, whereas a Hi voltage is applied to a second electrode 14 above which a region to which the droplet 51 is not desired to move is located.

<Method for Producing Microfluidic Device 1>

A method for producing the microfluidic device 1 will be described next. First, materials for layers of the microfluidic device 1 and a method for forming the layers will be described.

At least the insulating substrate 41 of the insulating substrate 11 and the insulating substrate 41, which are to be supporting substrates, is a transparent insulating substrate. The insulating substrates 11 and 41 can be, for example, glass substrates. However, the insulating substrates 11 and 41 are not limited to these. Alternatively, the insulating substrates 11 and 41 can be plastic substrates, ceramic substrates, or the like.

Examples of a material for the gate insulating film 22 encompass silicon nitride (SiNx), spin-on glass (SOG), and $SiO_2$. The gate insulating film 22 can be formed by any of various publicly known methods such as a chemical vapor deposition (CVD) method and a spin coating method.

The TFTs 20 can be publicly known TFTs. As described earlier, FIG. 3 shows an example in which the TFTs 20 are each a bottom gate (inversely staggered) TFT. Note, however, that a structure of each of the TFTs 20 is not particularly limited. Note that layers of each of the TFTs 20 are each made of a publicly known material and formed by a publicly known method. Thus, materials for the layers of each of the TFTs 20 and a method for forming the layers will not be described. The layers, which include the gate insulating film 22, of the TFTs 20 can each be set to have a conventional thickness.

The electrodes 14 are each a light-blocking metal electrode, and may each be made, for example of (i) a metal such as aluminum (Al), copper (Cu), titanium (Ti), molybdenum (Mo), or silver (Ag) or (ii) an alloy of these metals.

A surface of a metal is typically smoother than a surface of an ITO. Therefore, in a case where the electrodes 14 are metal electrodes, it is possible to form segment electrodes having surfaces smoother than those of ITO electrodes.

Among the materials listed above, Mo particularly has a high etching rate during wet etching, and therefore causes tapering of edges of the electrodes 14 to be gradual. This allows the dielectric layer 15, which covers the edges of the electrodes 14, to further cover the electrodes 14. In particular, in a case where the edges of the electrodes 14 are directly covered with the ion barrier layer 17, the ion barrier layer 17, which covers the electrodes 14, can further cover the electrodes 14.

An electrode 42 is a light-transmissive electrode, and is made of, for example, a transparent electrode material such as an indium tin oxide (ITO) or an indium zinc oxide (IZO). Note that the electrode 42 can be, instead of being made of a transparent electrode material, a semi-transparent electrode formed by use of a thin film of any of the metals listed above. In a case where the electrode 42 is a semi-transparent electrode made of a metal material, the electrode 42 and the water-repellent layer 43 covering the electrode 42 can each have a smooth surface. This allows the droplet 51 which is in contact with the water-repellent layer 43 to even more easily slide.

Any of the metals above or an alloy thereof can also be used for the gate wires and for the source wires. Note that the electrodes 14, the gate wires, and the source wires can be made of a single material or can be made of different materials.

The electrodes 14 and 42, the gate wires, and the source wires can each be formed by (i) forming an electroconductive film by use of any of the materials above and then (ii) patterning the electroconductive film.

The electroconductive film can be formed by a publicly known method such as a sputtering method. The electroconductive film can be patterned by a publicly known patterning method such as photolithography.

The electrode 42, a gate wire, and a source wire, each of which has a thickness that is not particularly limited, can each be set to have a conventional thickness.

It is only necessary that the electrodes 14 each be appropriately set, in accordance with the material for the electroconductive film, to have a thickness that makes it possible to block light. The thickness is not particularly limited, and is preferably not less than 50 nm for the purpose of blocking light. Note, however, that in a case where the electrodes 14 have an excessive thickness, it is difficult to smooth surfaces of the dielectric layer 15 and the water-repellent layer 18. It is therefore preferable to set the thickness of the electrodes 14 to, for example, approximately 50 nm to 200 nm.

The first flattening resin layer 13 and the second flattening resin layer 16 can each be made of, for example, a resin. Examples of the resin encompass polyimide, an acrylic resin, and a resist material. Examples of the resist material encompass photosensitive resin materials such as a photosensitive acrylate material.

The first flattening resin layer 13 and the second flattening resin layer 16 each have a thickness of, for example, several micrometers. Examples of a method for forming the first flattening resin layer 13 and the second flattening resin layer 16 encompass a spin coating method and a slit coating method.

After the first flattening resin layer 13 has been formed, the contact holes 19 can be made by patterning the first flattening resin layer 13 by photolithography or the like.

After the second flattening resin layer 16 has been formed, the second flattening resin layer 16 can be patterned by photolithography or the like so as to have a form of islands. According to Embodiment 1, the second flattening resin layer 16 is formed so as to fill only the contact holes 19. Therefore, conditions for photolithography are desirably strictly controlled.

Examples of a material for the ion barrier layer 17 encompass inorganic materials such as a silicon oxide, a silicon nitride, and a tantalum oxide.

The ion barrier layer 17 can be formed by a publicly known method such as a CVD method or a vacuum vapor deposition method.

Since the water-repellent layer 18 is not insulating, insulation of the ion barrier layer is important. The ion barrier layer 17 which is excessively thin makes it impossible to obtain sufficient insulation. This causes leakage (leak current) to occur between the ion barrier layer 17 and the electrode 42 via the droplet 51. Meanwhile, the ion barrier layer 17 which is excessively thick makes it difficult for an electrowetting phenomenon to occur. The ion barrier layer 17 is formed to have a thickness of, for example, several hundreds of nanometers (e.g., 250 nm).

Easiness of the occurrence of an electrowetting phenomenon is also affected by a dielectric constant of the dielectric layer 15, particularly a dielectric constant of the ion barrier layer 17. The ion barrier layer 17 which is made of, for example, a silicon nitride as described above has a dielectric constant of approximately 6 (F/m) to 6.5 (F/m).

Examples of a material for the water-repellent layer encompass fluorine-based water-repellent chemicals such as a perfluoro amorphous resin. Examples of such a water-repellent chemical encompass "CYTOP (registered trademark)-CTL107MK" and "CYTOP (registered trademark)-CTL809A", both of which are manufactured by Asahi Glass Co., Ltd.

The water-repellent layer 18 can be formed by a publicly known method such as a dip coating method, a spin coating method, or a slit coating method.

Easiness of the occurrence of an electrowetting phenomenon is also affected by a thickness of the water-repellent layer 18. The water-repellent layer 18 which is excessively thick makes it difficult for an electrowetting phenomenon to occur. The water-repellent layer 18 is formed to have a thickness of, for example, several tens of nanometers (e.g., 50 nm).

A process for producing the microfluidic device 1 will be described next.

First, the insulating substrate 11, which is for example a large glass substrate, is washed. Then, for example, gate electrodes 21 and the gate wires, the gate insulating film 22, semiconductor layers 23 (each including the n+ layer and the i layer), source electrodes 24, and drain electrodes 25 and the source wires are provided on the insulating substrate 11 in this order by an ordinary method (a drive element forming step). This causes the gate insulating film 22, the TFTs 20, the gate wires, and the source wires to be provided on the insulating substrate 11.

In a case where the TFTs 20 are thus provided on the insulating substrate 11, the surface of the thin film electronic circuit layer 12, on which surface the TFTs 20 are provided, has unevenness having a height of not more than 1600 nm.

Then, the first flattening resin layer 13 is formed by an ordinary method so as to cover the TFTs 20. This causes the unevenness of the surface of the thin film electronic circuit layer 12, which includes the TFTs 20, to be smoothed (a first flattening resin layer forming step).

Subsequently, regions of the first flattening resin layer 13, which regions include the respective drain electrodes 25, are provided with resist masks, and then etching is carried out. This forms the contact holes 19 in the first flattening resin layer 13 (a contact hole forming step). Note that etching is carried out by, for example, dry etching or wet etching.

For example, the contact holes 19 are made at respective interfaces between the first flattening resin layer 13 and the drain electrodes 25 so as to have an opening diameter (diameter) of 5 μm and a height of 2 μm.

Then, on the first flattening resin layer 13, an electroconductive film, which is to be formed into the electrodes 14 and is made of a light-blocking thin metal, is formed by a sputtering method. Then, resist masks are provided on certain regions of the conductive film, and then etching is carried out. This forms the plurality of electrodes 14 which are patterned (a first electrode forming step).

The electrodes 14 are thus electrically connected to the respective drain electrodes 25 of the TFTs 20 via the respective contact holes 19 after having been formed.

Then, the second flattening resin layer 16 is formed on the first flattening resin layer 13 so as to fill (i) the contact holes 19 and (ii) level differences between the electrodes 14 (a second flattening compound resin layer forming step, a dielectric layer forming step).

The second flattening resin layer 16 can be formed as in the case of the first flattening resin layer 13. In Embodiment 1, the second flattening resin layer 16 is formed as below. Specifically, a resin layer that is to be formed into the second flattening resin layer 16 is formed. Then, a photomask different from a photomask used for the formation of the first flattening resin layer 13 is used to subject the resin layer to exposure, development, decolorization, pre-bake, and post-bake under processing conditions identical to the processing conditions under which the first flattening resin layer forming step is carried out, so that a surface of the second flattening resin layer 16 in the contact holes 19 and between the electrodes 14 is flush with the surfaces, except the surfaces located in the contact holes 19, of the electrodes 14.

Then, above the insulating substrate 11, the ion barrier layer 17 is formed by an ordinary method so as to cover the second flattening resin layer 16, the electrodes 14, and the first flattening resin layer 13 (an ion barrier layer forming step, the dielectric layer forming step).

According to Embodiment 1, the ion barrier layer 17, which is made of silicon nitride (SiNx) and has a thickness of 250 nm, is formed by, for example, a CVD method, and then the ion barrier layer 17 is patterned as necessary by photolithography so that for example, a part thereof to be connected to an outside, such as the connecting wires 38, is exposed.

Then, a water-repellent layer forming step (a water-repellent treatment step) is carried out so as to form the water-repellent layer 18 above the insulating substrate 11 above which the ion barrier layer 17 is provided.

Then, as necessary, the insulating substrate 11 is cut so as to have a desired size, and then a surface of the insulating substrate 11 is washed. Alternatively, as necessary, the insulating substrate 11 above which the water-repellent layer 18 has not been formed can be cut so as to have a desired size.

Through this process, the array substrate 10, which has a surface on which the water-repellent layer 18 is provided as a hydrophobic surface (water-repellent surface), is completed.

Then, by use of the sealing material (not illustrated), the array substrate 10 and the counter substrate 40 which is produced conventionally, are combined together so that the electrodes 14 of the array substrate 10 and the electrode 42 of the counter substrate 40 face each other. During the combination, as necessary, a space between the array substrate 10 and the counter substrate 40 is filled with the nonionic liquid 52, and an opening (not illustrated) via which to pour a liquid into the cell 2 is formed in the space between the array substrate 10 and the counter substrate 40. The microfluidic device 1 is thus produced.

Note that the counter substrate 40 can be alternatively produced by, for example, (i) providing the insulating substrate 41, on which a solid ITO film, for example is provided as the electrode 42, with the water-repellent layer 43 as in the case of the provision of the water-repellent layer of the array substrate 10. Note also that the opening (not illustrated) via which to pour a liquid into the cell 2 can be formed not only in the space between the array substrate 10 and the counter substrate 40 but also in the counter substrate 40.

<Effects>

As described earlier, according to the microfluidic device 1, the droplet 51 which is electroconductive is sandwiched between the water-repellent layers 18 and 43, and an electrowetting phenomenon is caused by causing an electric potential difference between the droplet 51 and the electrodes 14, which are directly below the droplet 51 and under the dielectric layer 15, so that the droplet 51 moves along the water-repellent layer 18.

In this case, application of different voltages to the respective adjacent electrodes 14a and 14b causes the droplet 51 to move along the water-repellent layer 18 across the plurality of electrodes 14.

Therefore, the microfluidic device 1 is desirably arranged so that the water-repellent layer 18 provided above the electrodes 14 is smooth and has low fluid friction.

In particular, as described earlier, in the case of the microfluidic device 1 for causing a droplet to move across the plurality of electrodes 14, a higher voltage needs to be applied than in the case of an electrowetting display. In a case where a higher voltage is applied to each of the electrodes 14, the droplet 51 more easily slides. Note, however, that a voltage that is as low as possible is desirably applied to each of the electrodes 14 in view of (i) voltage resistance of TFTs 20 that are electrically connected to the respective electrodes 14 and (ii) voltage resistance of the dielectric layer 15, particularly voltage resistance of the ion barrier layer 17. If the droplet 51 does not slide easily, then it is necessary to apply a higher voltage to cause the droplet 51 to move smoothly.

Consequently, in order to apply a lower voltage to each of the electrodes 14 of the microfluidic device 1, it is extremely important to allow the droplet 51 to more easily slide along the water-repellent layer 18, which is provided above the electrodes 14.

In particular, in a case where in a case where surfaces of the electrodes 14 are provided with many pieces of unevenness, a surface of the dielectric layer 15, which is a layer provided on the electrodes 14, is also provided with many pieces of unevenness, and further, an outermost surface, which is to serve as a droplet transfer surface, of the water-repellent layer 18, which is a layer provided on the dielectric layer 15, is also provided with many pieces of unevenness. In a case where the droplet transfer surface is thus provided with many pieces of unevenness, fluid friction easily occurs in an interface between the droplet transfer surface and the droplet 51. This may cause the movement of the droplet 51 to be stopped halfway or may prevent the droplet 51 from moving as intended.

Further, unevenness of the dielectric layer 15, which serves as the base for the water-repellent layer 18, also serves as resistance (fluid friction) against the droplet 51 which is moving, and consequently prevents the droplet 51 from moving.

As described above, as a result of diligent study, the inventors of the present invention found that the reason why movement of the droplet 51 is prevented and a voltage that is applied to each of the electrodes 14 so that the droplet 51 moves is made higher is eventually due to unevenness of the surfaces of the electrodes 14 as described earlier. Then, the inventors of the present invention found that according to the microfluidic device 1, totally different from an electrowetting display, for causing a droplet to move across the plurality of electrodes 14, in causing the droplet 51 to smoothly move, it is important that the water-repellent layer 18 along which to cause the droplet 51 to slide should have an even surface, and it is particularly important that the water-repellent layer 18 which is provided above the electrodes 14 should be more even. Subsequently, the inventors of the present invention found that in order that the water-repellent layer 18 which is provided above the electrodes 14 is more even, it is important that the electrodes 14 should have more even surfaces.

As described above, a surface of a metal is smoother than a surface of an ITO. Evenness of the surface of the water-repellent layer 18 follows evenness of the surface of the dielectric layer 15, which serves as a base for the water-repellent layer 18, and evenness of the surface of the dielectric layer 15 follows evenness of the surfaces of the electrodes 14, which serve as a base for the dielectric layer 15.

Therefore, the surfaces of the electrodes 14 can be made more even than those of conventional electrodes by (i) causing the first flattening resin layer 13 to smooth the unevenness of the thin film electronic circuit layer 12 which unevenness is caused by the plurality of TFTs 20 and (ii) providing, on the first flattening resin layer 13, the electrodes 14 which are light-blocking metal electrodes. As a result, the surface of the water-repellent layer 18, which is provided above the electrodes 14, can be made more even than that of a conventional water-repellent layer. This allows a reduction in fluid friction against the droplet 51.

Figure 7:
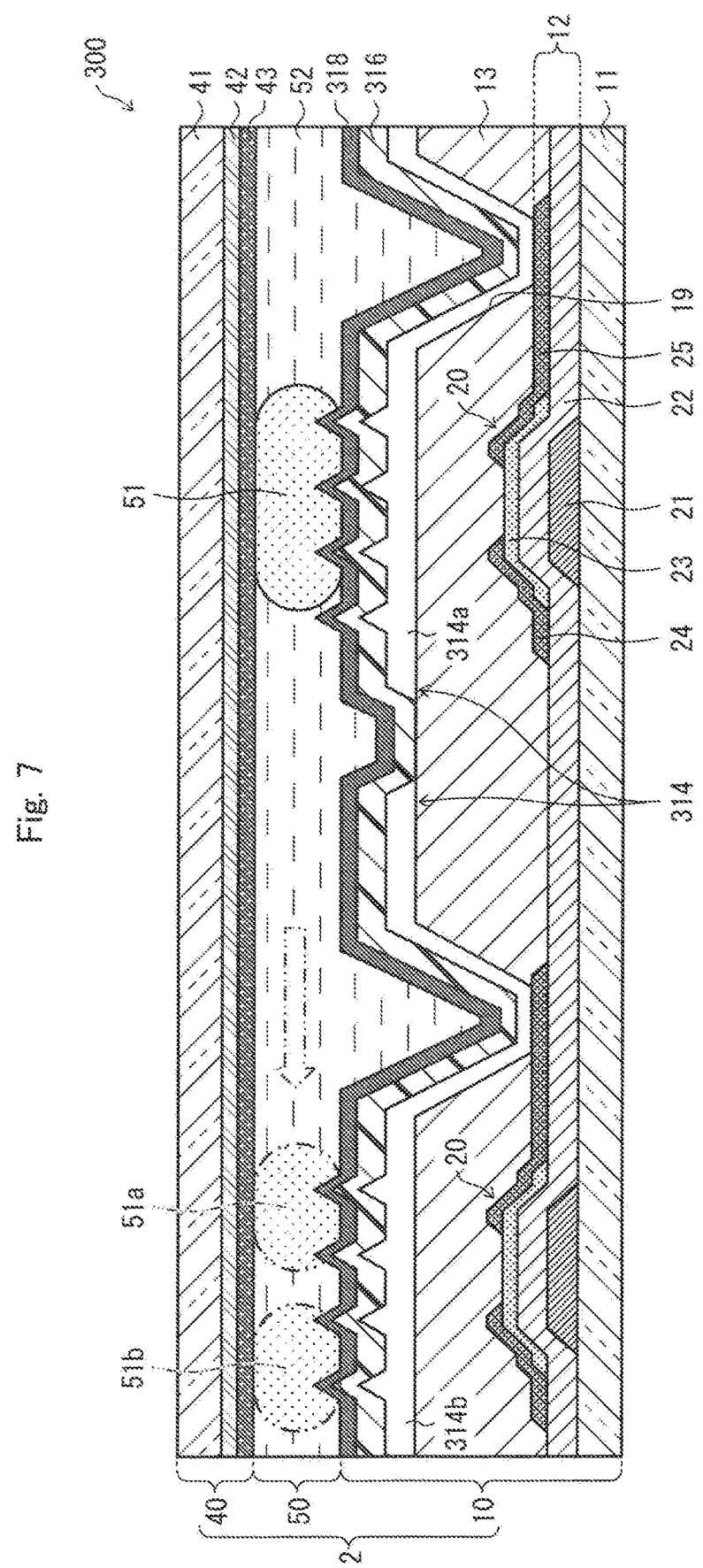
FIG. 7 is a cross-sectional view schematically illustrating (i) an example arrangement of a main part of a microfluidic device including segment electrodes made of an ITO and (ii) a problem of the microfluidic device.

In a case where the surfaces of the dielectric layer 15 and of the water-repellent layer 18 have unevenness, the fluid friction against the droplet 51 prevents the movement of the droplet 51. This may cause the following problem. Specifically, as shown by two-dot chain lines in FIG. 7, even in a case where the droplet 51 moves, the droplet 51 partially may remain on a path through which the droplet 51 moves, and the droplet 51 may be separated into a plurality of droplets (two droplets 51a and 51b in the example shown in FIG. 7).

According to Embodiment 1, however, resistance (fluid friction) against the droplet 51 which is moving can be reduced. This allows movement of the droplet 51 without causing the droplet 51 to be separated (see FIG. 1).

Therefore, according to Embodiment 1, it is possible to provide the microfluidic device 1 in which (i) the surface of the water-repellent layer 18 which is provided above the electrodes 14 is even and (ii) the droplet 51 can easily move in the internal space 50.

According to Embodiment 1, the second flattening resin layer 16 fills (i) the contact holes 19 and (ii) the spaces between adjacent electrodes 14. In addition, unlike an electrowetting display, no protruding part (protrusion) (e.g., pixel separation wall) is provided in the internal space 50. Therefore, the surface of the water-repellent layer 18, which surface is to serve as a droplet transfer surface, is an even surface having no protrusion. According to Embodiment 1, it is therefore possible to provide the microfluidic device 1 in which (i) the surface of the water-repellent layer 18 is even and (ii) the droplet 51 can easily move in the internal space 50.

In addition, the electrodes 14 which have unevenness (i) are less covered with the dielectric layer 15 and (ii) cause electric fields to be easily concentrated on protrusions of the unevenness. This causes leakage to easily occur between the electrodes 14 and the electrode 42 via the droplet 51.

In addition, the water-repellent layer 18 is not insulating. Therefore, the dielectric layer 15 which has any slight serves as a leak path. This causes leakage to occur between the electrodes 14 and the electrode 42 via the droplet 51. As a result, a short circuit occurs between the electrodes 14 and the electrode 42, and so that the microfluidic device 1 is damaged.

According to Embodiment 1, however, the electrodes 14 can be further covered with the dielectric layer 15 as described earlier. In addition, the electrodes 14 have no protrusions. This makes it difficult for electric fields to be concentrated in the electrodes 14, and therefore makes it difficult for leakage to occur.

In addition, unlike an electrowetting display, the microfluidic device 1 includes no member that blocks external light and is exemplified by a polarizing plate and a color filter. This causes the TFTs 20 to be easily exposed to external light.

Figure 3:
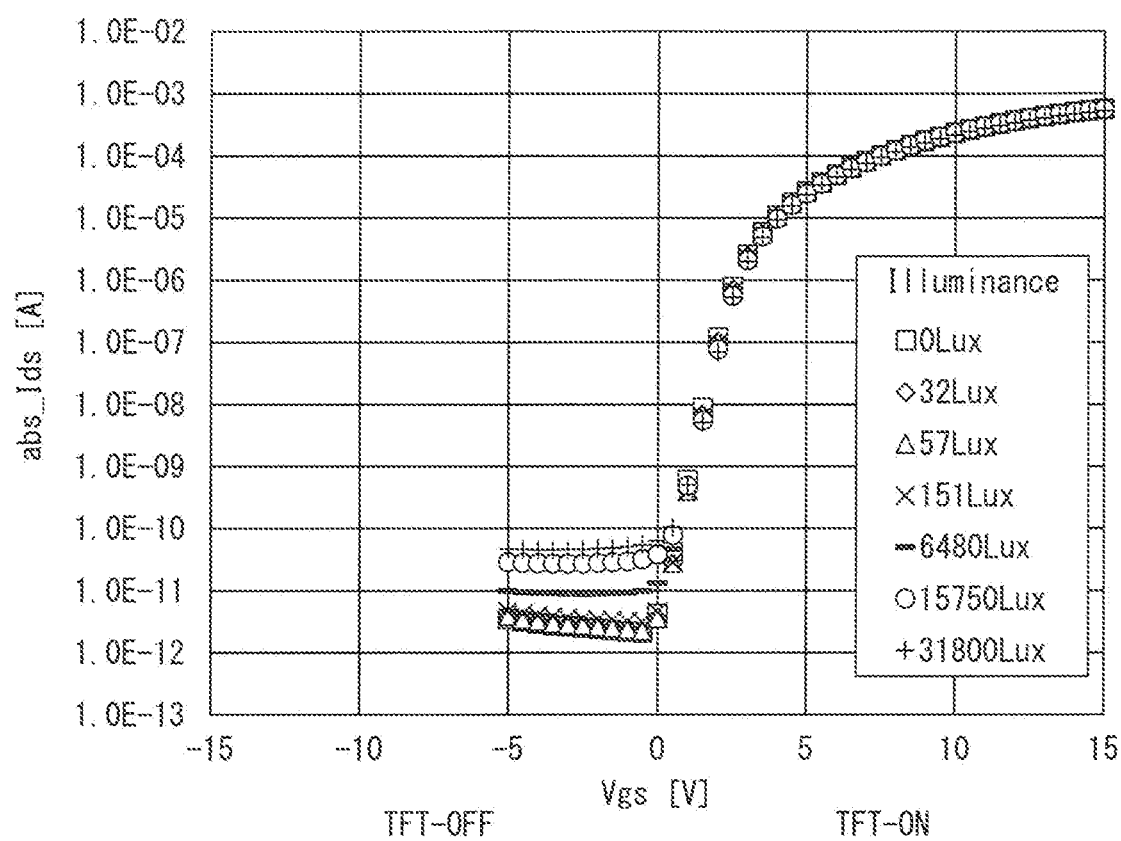
FIG. 3 is a graph showing a relationship among an absolute value of a drain electric current of a TFT, a gate voltage, and an illuminance of external light.

FIG. 3 is a graph showing a relationship among an absolute value of a drain electric current Ids of a TFT 20, a gate voltage Vgs, and an illuminance of external light.

FIG. 3 shows Ids-Vgs characteristics obtained in a case where external light has illuminances of 0 Lux, 32 Lux, 57 Lux, 151 Lux, 6480 Lux, 15750 Lux, and 31800 Lux.

As illustrated in FIG. 3, external light which has a greater illuminance causes a greater off-leakage current to flow through a TFT 20 which is off.

According to Embodiment 1, the electrodes 14, each of which is a light-blocking metal electrode, makes it possible to block external light. Thus, it is possible to make it difficult for an off-leakage current to flow through the TFT 20 (see, for example, "0 Lux" in FIG. 3). This makes it possible to prevent abnormal circuit behaviors such as a malfunction of the TFT 20 which malfunction is caused in a case where the TFT 20 is exposed to external light.

Alternatively, external light can also be blocked by (i) additionally providing, on the first flattening resin layer 13, a light-blocking layer which is made of a material having a low light transmittance or (ii) causing the first flattening resin layer 13 to serve as a light-blocking layer by imparting a light-blocking function to the first flattening resin layer 13. Note, however, that in a case where such a light-blocking layer is combined with an ITO electrode, the ITO electrode causes many pieces of unevenness to be formed on the surface of the water-repellent layer 18.

According to Embodiment 1, in a case where the electrodes 14 are each a light-blocking metal electrode, it is possible to prevent an off-leakage current without the need to additionally providing a light-blocking layer.

Embodiment 2

Embodiment 2 of the present invention is as described below with reference to FIG. 4. The following description of Embodiment 2 will deal mainly with how Embodiment 2 differs from Embodiment 1. In the following description, members having functions identical to those of the respective members described in Embodiment 1 are given respective identical reference numerals, and a description thereof is omitted.

<Schematic Arrangement of Microfluidic Device 1>

Figure 4:
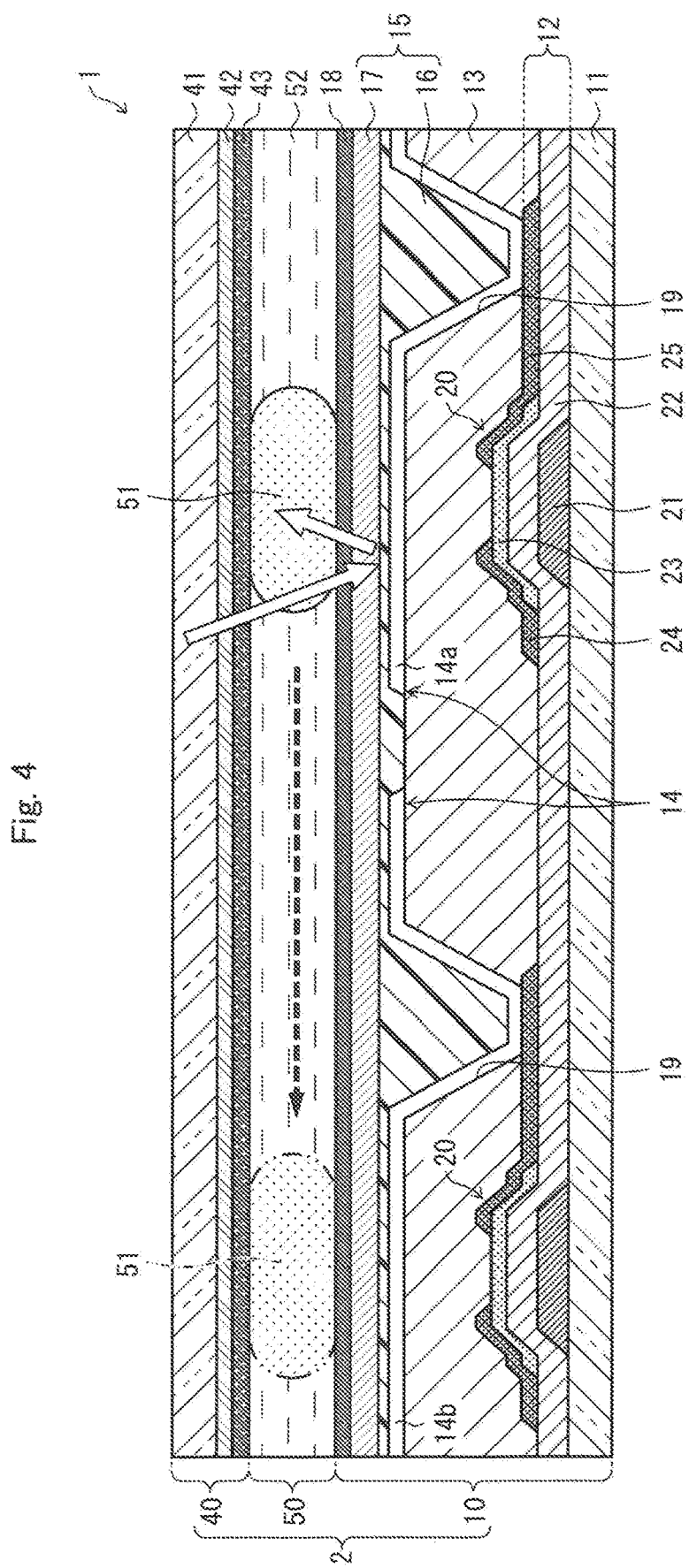
FIG. 4 is a cross-sectional view schematically illustrating an example arrangement of a main part of a microfluidic device in accordance with Embodiment 2 of the present invention.

FIG. 4 is a cross-sectional view schematically illustrating an example arrangement of a main part of a microfluidic device 1 in accordance with Embodiment 2.

As illustrated in FIG. 4, the microfluidic device 1 in accordance with Embodiment 2 is identical in arrangement to the microfluidic device 1 in accordance with Embodiment 1 except that a second flattening resin layer 16 covers a plurality of electrodes 14 in an array substrate 10.

According to Embodiment 2, the second flattening resin layer 16 is provided on a first flattening resin layer 13 so as to (i) fill contact holes 19 and (ii) extremely thinly cover parts of the electrodes 14 which parts are located outside the contact holes 19. This smooths unevenness caused, on a surface of the first flattening resin layer 13, by the contact holes 19 and level differences between adjacent electrodes 14.

Parts of the second flattening resin layer 16 which parts are located on the parts of the electrodes 14 which parts are located outside the contact holes 19 have a thickness which is preferably in a range of 10 nm to 10 µm and more preferably in a range of 500 nm to 1 µm. In particular, in a case where the parts of the second flattening resin layer 16 which parts are located on the parts of the electrodes 14 which parts are located outside the contact holes 19 have a thickness of 500 nm to 1 µm, (i) the unevenness can be sufficiently smoothed, (ii) an ion barrier layer 17 is guaranteed to be insulating, and (iii) a capacitance necessary for electrowetting can be secured.

Therefore, according to Embodiment 2, the ion barrier layer 17 is provided, on the second flattening resin layer 16 having an even surface, so that the ion barrier layer 17 has a uniform thickness and is spaced from the electrodes 14.

On the ion barrier layer 17, which has an even surface, a water-repellent layer 18 is provided so as to have a uniform thickness.

<Method for Producing Microfluidic Device 1>

The microfluidic device 1 in accordance with Embodiment 2 can be produced as in the case of Embodiment 1 except that (i) conditions for slit coating, such as a coating gap between an inside and an outside the contact holes 19 and (ii) and conditions for photolithography are changed in the second flattening resin layer forming step of Embodiment 1.

According to Embodiment 2, since the parts of the second flattening resin layer 16 which parts are located on the parts of the electrodes 14 which parts are located outside the contact holes 19 remain without being removed, the second flattening resin layer 16 and the ion barrier layer 17 can be patterned together by a single time of photolithography after the ion barrier layer 17 is formed.

<Effects>

According to Embodiment 2, the contact holes 19 are filled with the second flattening resin layer 16. This makes it possible to obtain effects similar to those of Embodiment 1.

According to the microfluidic device 1, it is important that the ion barrier layer 17 should be insulating and leakage-resistant.

In a case where an electrical field is applied to a droplet 51, ions in the droplet 51 move. Note, however, that an inorganic layer such as the ion barrier layer 17 has defects at a molecular level. In view of this, in a case where the ions in the droplet 51 pass through defects of the water-repellent layer 18 and the defects of the ion barrier layer 17 and then reach the electrodes 14, leakage occurs.

The dielectric layer 15 which includes the ion barrier layer 17 which is made of an inorganic material has a high dielectric constant. This causes a reduction in voltage for moving the droplet 51. Meanwhile, however, a risk of lower leakage resistance is increased.

According to Embodiment 2, the second flattening resin layer 16 covers the parts of the electrodes 14 which parts are located outside the contact holes 19. This allows an increase in insulation against an electrode by the second flattening resin layer 16 provided on the electrodes 14. This makes it possible to guarantee that the ion barrier layer 17 is insulating.

A resin layer has a property of (i) repelling an ionic liquid such as water and (ii) making it difficult for ions to pass therethrough. Therefore, since the second flattening resin layer 16 covers the parts of the electrodes 14 which parts are located outside the contact holes 19, it is possible to reinforce leakage resistance of the ion barrier layer 17. This allows the array substrate 10 to be more resistant to leakage.

Embodiment 2 can be less strict about conditions for photolithography of the second flattening resin layer 16 than a case where the contact holes 19 are filled with the second flattening resin layer 16 so that the surface of the second flattening resin layer 16 is flush with the surfaces of the electrodes 14.

Furthermore, according to Embodiment 2, since the second flattening resin layer 16 covers the plurality of electrodes 14, unevenness between the electrodes 14 can be smoothed. As described earlier, a level difference between adjacent electrodes 14 is not fatal. However, repeated operation of the droplet 51 may affect electrowetting performance by, for example, causing the water-repellent layer 18 to peel off at a corner of an electrode 14. According to Embodiment 2, however, it is possible to achieve more complete smoothing of the surface of the array substrate 10, so that greater reliability can be achieved.

Embodiment 3

Embodiment 3 of the present invention is as described below with reference to FIG. 5. The following description of Embodiment 3 will deal mainly with how Embodiment 3 differs from Embodiments 1 and 2. In the following description, members having functions identical to those of the respective members described in Embodiments 1 and 2 are given respective identical reference numerals, and a description thereof is omitted.

<Schematic Arrangement of Microfluidic Device 1>

Figure 5:
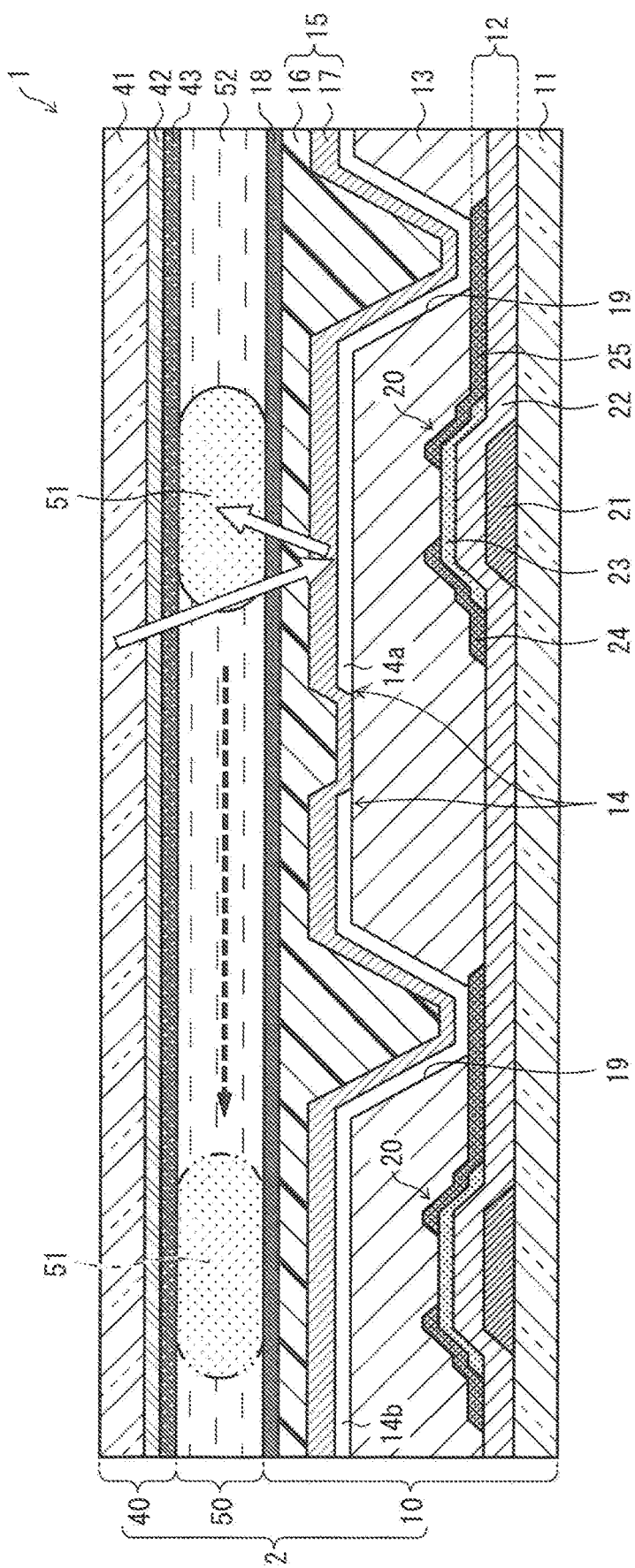
FIG. 5 is a cross-sectional view schematically illustrating an example arrangement of a main part of a microfluidic device in accordance with Embodiment 3 of the present invention.

FIG. 5 is a cross-sectional view schematically illustrating an example arrangement of a main part of an array substrate 10 in accordance with Embodiment 3.

As illustrated in FIG. 5, a microfluidic device 1 in accordance with Embodiment 3 is identical in arrangement to the microfluidic devices 1 in accordance with Embodiments 1 and 2 except that, in the array substrate 10 in accordance with Embodiment 3, (i) an ion barrier layer 17 covers a plurality of electrodes 14 and (ii) a second flattening resin layer 16 covers the ion barrier layer 17.

Specifically, according to Embodiment 3, the ion barrier layer 17 is provided between the electrodes 14 and the second flattening resin layer 16, so that the ion barrier layer 17 directly covers the electrodes 14 located inside and outside contact holes 19. According to Embodiment 3, the second flattening resin layer 16 is provided on the ion barrier layer 17 so as to (i) fill the contact holes 19 from above the ion barrier layer 17 and (ii) extremely thinly cover parts of the ion barrier layer 17 which parts are located outside the contact holes 19.

As in Embodiment 1, parts of the second flattening resin layer 16 which parts are located above parts of the electrodes 14 which parts are located outside the contact holes 19 have a thickness which is preferably in a range of 10 nm to 10 µm and more preferably in a range of 500 nm to 1 µm. As described in Embodiment 1, in particular, in a case where the parts of the second flattening resin layer 16 which parts are located above the parts of the electrodes 14 which parts are located outside the contact holes 19 have a thickness of 500 nm to 1 µm, (i) unevenness can be sufficiently smoothed, (ii) the ion barrier layer 17 is guaranteed to be insulating, and (iii) a capacitance necessary for electrowetting can be secured.

According to Embodiment 3, as in Embodiments 1 and 2, a water-repellent layer 18 is provided, on the ion barrier layer 17 having an even surface, so as to have a uniform thickness.

<Method for Producing Microfluidic Device 1>

The microfluidic device 1 in accordance with Embodiment 3 can be produced as in the case of Embodiment 2 except that an order of Embodiment 3 in which order an ion barrier layer forming step and a second flattening resin layer forming step are carried out is reversed from that of Embodiment 2.

Specifically, according to Embodiment 3, the electrodes 14, which are patterned, are formed. Then, the ion barrier layer 17 is provided on a first flattening resin layer 13 as in the case of Embodiment 1 so as to cover the electrodes 14. Then, after the second flattening resin layer 16 is provided on the ion barrier layer 17 as in the case of Embodiment 2, the water-repellent layer 18 is provided on the second flattening resin layer 16.

<Effects>

According to Embodiment 3, the contact holes 19 are filled with the second flattening resin layer 16, and the parts of the electrodes 14 which parts are located outside the contact holes 19 are covered with the second flattening resin layer 16 via the ion barrier layer 17. This makes it possible to obtain effects similar to those of Embodiments 1 and 2.

In the case of the microfluidic device 1, a quality and a density of a layer provided on the electrodes 14 are important.

According to Embodiment 2, the ion barrier layer 17 is provided on the second flattening resin layer 16. Therefore, there is concern that a gas resulting from degasification of the second flattening resin layer 16 causes the ion barrier layer 17 to have a lower quality. According to Embodiment 3, however, the ion barrier layer is provided directly on the electrodes 14 in substantially an entire region of the array substrate 10. This allows the above concern to be alleviated.

Embodiment 4

Embodiment 4 of the present invention is as described below with reference to FIG. 6. The following description of Embodiment 4 will deal mainly with how Embodiment 4 differs from Embodiments 1 through 3. In the following description, members having functions identical to those of the respective members described in Embodiments 1 through 3 are given respective identical reference numerals, and a description thereof is omitted.

In recent years, an operation of droplets by use of magnetic particles is proposed as disclosed in, for example, Patent Literature 2.

Magnetic particles have magnetism. Therefore, in a case where magnetic particles obtained by fixing an antibody or magnetic particles obtained by binding proteins are attracted to a magnet in carrying out, for example, co-immunoprecipitation or the like for separating proteins, it is possible to quickly separate targets in a solution under non-strict conditions without use of a centrifugal separator. In addition, as disclosed in Patent Literature 2, the use of magnetic particles makes it possible to carry out washing for an immunoassay in which a target in a biological sample (e.g., blood or urine) is detected by use of an antibody that is unique to the target.

Embodiment 4 will discuss, as an example, a case where a microfluidic device 1 is used to wash a droplet 51 for an immunoassay.

<Schematic Arrangement of Microfluidic Device 1>

Figure 6:
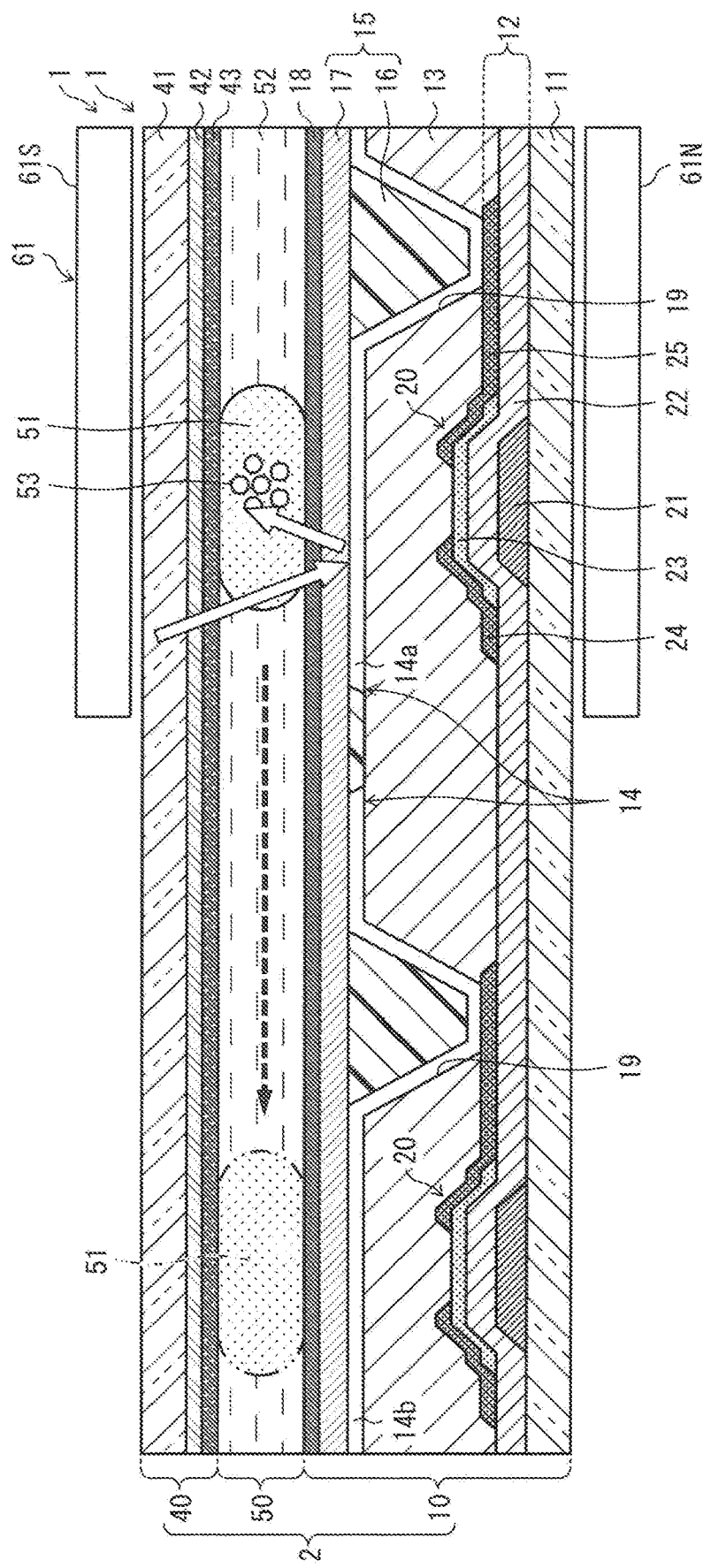
FIG. 6 is a cross-sectional view schematically illustrating an example arrangement of a main part of a microfluidic device in accordance with Embodiment 4 of the present invention.

FIG. 6 is a cross-sectional view schematically illustrating an example arrangement of a main part of the microfluidic device 1 in accordance with Embodiment 4.

As illustrated in FIG. 6, the microfluidic device 1 in accordance with Embodiment 4 is identical in arrangement to the microfluidic devices 1 in accordance with Embodiments 1 through 3 except that (i) the droplet 51 contains magnetic particles 53 and (ii) a magnet 61 is provided.

Specifically, according to Embodiment 4, the droplet 51 contains the plurality of magnetic particles 53 therein. The magnetic particles 53 are fixed in the presence of a magnetic field. The magnetic field is imparted to the plurality of magnetic particles 53 in the droplet 51 by a north pole 61N and a south pole 61S of the magnet 61.

Note that to fix (fixing of) the magnetic particles 53 means that the magnetic particles 53 are substantially immobile at a given position in the droplet 51.

Examples of a material for the magnetic particles 53 encompass a paramagnetic material, a ferromagnetic material, a ferrimagnetic material, and a metamagnetic material. Examples of a proper paramagnetic material encompass (i) iron, (ii) nickel, (iii) cobalt, and (iv) metal oxides such as $Fe_3O_4$, $BaFe_{12}O_{19}$, CoO, NiO, $Mn_2O_3$, $Cr_2O_3$, and CoMnP.

The south pole 61S of the magnet 61 is provided so as to face a top surface of an insulating substrate 41. The north pole 61 N of the magnet 61 is provided so as to face a bottom surface of an insulating substrate 11. In this case, the magnet 61 can be integrated with the microfluidic device 1, or can be provided so as to be sufficiently close to the insulating substrate 41 and to the insulating substrate 11.

In a case where the magnet 61 is provided so as to be close to the insulating substrate 41 and to the insulating substrate 11, the magnetic particles 53 are properly attracted to the magnet 61, so as to be fixed in the droplet 51. In this case, all of or substantially all of the magnetic particles 53 are retained in a single droplet 51. The magnetic particles 53 attracted to the magnet 61 are, for example, localized at a center position in the droplet 51. The magnet 61 can be a single permanent magnet which is U-shaped, C-shaped, or horseshoe-shaped. Alternatively, the magnet 61 can be an electromagnet. The magnet 61 is provided so as to cause a magnetic field to fix and retain the magnetic particles 53.

FIG. 6 shows an example in which the magnet 61 is provided so as to face the top surface of the insulating substrate 41 and the bottom surface of the insulating substrate 11. Note, however, that Embodiment 4 is not limited to this example. Alternatively, the magnet 61 can be provided so as to face only one of the insulating substrates 11 and 41. Alternatively, the magnet 61 can be movably provided so as to allow the magnetic particles 53 to move. Also in Embodiment 4, a nonionic liquid 52 is unessential.

The microfluidic device 1 in accordance with Embodiment 4 includes the magnet 61 and uses the magnet 61 to at least fix the magnetic particles 53.

Therefore, electrodes 14 and 42 are each made of a nonmagnetic material which is not affected by a magnetic field of the magnet 61. According to Embodiment 4, the electrodes 14 are each made of a nonmagnetic metal material. Examples of the nonmagnetic metal material encompass metal materials mentioned as examples in Embodiment 1, such as Al, Cu, Ti, Mo, Ag, and an alloy of these metals. Note that a transparent electrode made of, for example, an ITO is nonmagnetic. Therefore, the electrode 42 can be a light-transmissive electrode such as a transparent electrode mentioned as an example in Embodiment 1. Alternatively, the electrode 42 can be a light-transmissive electrode such as a semi-transparent electrode made of a nonmagnetic metal thin film.

<Washing of Droplet 51 for Immunoassay by Use of Microfluidic Device 1>

In a typical immunoassay, a droplet 51 containing a first antibody bound to a magnetic particle 53 (magnetic particle-antibody complex) and a droplet 51 containing a target are mixed, so that the target is bound to the magnetic particle-antibody complex in a mixed droplet 51. Then, in a case where a droplet 51 containing a second antibody conjugated to a fluorescent substance is added to the mixed droplet 51, the second antibody binds to the target which has been bound to the magnetic particle-antibody complex, so as to form an antibody-bound complex which is a complex of the magnetic particle 53, the first antibody, the target, and the second antibody.

"Washing" refers to separating the antibody-binding complex from non-binding antibodies so as to (i) remove non-binding a second antibody which may give false signals and (ii) retain only the antibody-bound complex.

In a washing step, a droplet 51 containing the antibody-bound complex is mixed with a droplet 51 containing a wash buffer. Specifically, the washing is carried out as described below. Note that in FIG. 6, only the magnetic particles 53 are illustrated in the droplet 51, and antibodies and a target in the droplet 51 are not illustrated.

First, at least one of a droplet 51 containing the magnetic particles 53 (first droplet 51) and a droplet 51 for washing (second droplet 51) is moved by carrying out a droplet operation by use of electrowetting, so that the first droplet 51 and the second droplet 51 are mixed. Then, a magnetic field is imparted to the magnetic particles 53 by the magnet 61, so that the magnetic particles 53 are fixed.

Before the washing, the droplet 51 containing the magnetic particles 53 (first droplet 51) is a dirty droplet containing free non-binding antibodies and the antibody-bound complex, whereas the droplet 51 for washing (second droplet 51) is a clean buffer droplet containing only a wash buffer (e.g., HEPES: 4-(2-hydroxyethyl)-1-piperazine ethanesulfonic acid).

In a case where the movement of the droplet(s) 51 has been completed and consequently the first droplet 51 and the second droplet 51 are mixed, the antibody-bound complex moves from the first droplet 51 to the second droplet 51. In this case, the magnet 61 can be moved so that the antibody-bound complex can move from the first droplet 51 to the second droplet 51.

As a result, the first droplet 51 contains only non-binding antibodies, and the second droplet 51 contains only the antibody-bound complex while containing as few non-binding antibodies as possible.

Then, by a droplet operation, the mixed droplet 51 is separated into the first droplet 51 and the second droplet 51. This separates the mixed droplet 51 into (i) a droplet 51 containing the magnetic particles 53 and (ii) a droplet 51 containing substantially no magnetic particle 53.

Then, (i) the droplet 51 containing the magnetic particles 53 (i.e., the second droplet containing the antibody-bound complex at this stage) is fixed by the magnet 61 so as to remain stationary and (ii) the dirty droplet 51 (i.e., the first droplet 51 at this stage) is moved in a direction, indicated by the arrow shown in FIG. 6, so that the dirty droplet 51 moves away from the second droplet 51. This causes part or all of the droplet(s) 51 surrounding the magnetic particles 53 to be removed. This operation is repeated until a given degree of purity is achieved.

<Effects>

As described above, the microfluidic device 1 in accordance with Embodiment 4 includes the magnet 61 and uses the magnet 61 to fix or move the magnetic particles 53.

Therefore, the electrodes 14 and 42 are each made of a nonmagnetic material which is not affected by a magnetic field. In this case, since the electrodes 14 are each made of a metal material, the metal material is a nonmagnetic metal material.

The electrodes 14 are thus light-blocking metal electrodes each made of a nonmagnetic metal material. Therefore, it is possible to provide the microfluidic device 1 which (i) allows movement of the droplet 51 without being affected by a magnetic field, (ii) is highly smooth in surface of a water-repellent layer 18 provided above the electrodes 14, (iii) makes it easy for the droplet 51 to move, and (iv) makes it difficult for leakage to occur between the electrodes 14 and the electrode 42 via the droplet 51.

[Recap]

A microfluidic device 1 in accordance with Aspect 1 of the present invention includes: (I) a first substrate (array substrate 10); and (II) a second substrate (counter substrate 40) provided so as to face the first substrate, the first substrate including: a plurality of first electrodes (electrodes 14, 14a, 14b); a plurality of drive elements (TFTs 20), electrically connected to the respective plurality of first electrodes, for driving the respective plurality of first electrodes; a first flattening resin layer 13 that covers the plurality of drive elements; a dielectric layer 15 that covers the plurality of first electrodes; and a first water-repellent layer (water-repellent layer 18) that covers the dielectric layer 15, the second substrate including: at least one second electrode (electrode 42) provided so as to face the plurality of first electrodes; and a second water-repellent layer (water-repellent layer 43) that covers the at least one second electrode, the first substrate and the second substrate having therebetween an internal space 50 in which to cause electroconductive microfluid (droplet 51) to move across the plurality of first electrodes, and the plurality of first electrodes being provided on the first flattening resin layer 13 and each being a light-blocking metal electrode.

Specifically, the microfluidic device 1 includes: a first substrate (array substrate 10) and a second substrate (counter substrate 40) that are provided so as to face each other, the first substrate including: a plurality of first electrodes (electrodes 14); a plurality of drive elements (TFTs 20), electrically connected to the respective plurality of first electrodes, for driving the respective plurality of first electrodes; a first flattening resin layer 13 for smoothing unevenness of surfaces of the plurality of drive elements; a dielectric layer 15 that covers the plurality of first electrodes; and a first water-repellent layer (water-repellent layer 18) that covers the dielectric layer 15, the second substrate including: at least one second electrode (electrode 42) provided so as to face the plurality of first electrodes; and a second water-repellent layer (water-repellent layer 43) that covers the at least one second electrode, the first substrate and the second substrate having therebetween an internal space 50 in which to cause electroconductive microfluid (droplet 51) to move across the plurality of first electrodes, and the plurality of first electrodes being provided on the first flattening resin layer 13 and each being a light-blocking metal electrode.

In the case of a microfluidic device for causing a droplet to move across segment electrodes, a higher voltage needs to be applied than in the case of an electrowetting display.

Consequently, in order to apply a lower voltage to each of segment electrodes of a microfluidic device, it is extremely important to allow microfluid to more easily slide along a water-repellent layer, which is provided above the segment electrodes.

A surface of a metal is smoother than a surface of an ITO. Evenness of a surface of a water-repellent layer follows evenness of a surface of a dielectric layer, which serves as a base for the water-repellent layer, and evenness of the surface of the dielectric layer follows evenness of surfaces of first electrodes, which serve as a base for the dielectric layer.

According to the aspect, unevenness of surfaces of the drive elements is smoothed by the first flattening resin layer 13, and the plurality of first electrodes is provided, as the segment electrodes, on the first flattening resin layer 13. As compared with a microfluidic device in which ITO electrodes are used, according to the microfluidic device 1, in which each of the plurality of first electrodes is a light-blocking metal electrode, the first water-repellent layer has a more even surface, and fluid friction is less likely to occur. This allows the microfluid to easily slide along the surface of the first water-repellent layer.

Further, unevenness of a base for the first water-repellent layer serves as resistance (fluid friction) against the microfluid which is moving.

According to the aspect, the first electrodes each of which is made, on the first flattening resin layer 13, of a metal whose surface is smooth can be further covered with the dielectric layer 15, and the resistance (fluid friction) against the microfluid which is moving can be reduced. Thus, according to the aspect, movement of the microfluid is not prevented by peeling of the first water-repellent layer.

Therefore, the aspect makes it possible to provide the microfluidic device 1 which, as compared with a conventional microfluidic device, (i) is smoother in surface of a water-repellent layer provided above a segment electrode and (ii) makes it easier for microfluid to move in the internal space 50.

In addition, the first electrodes which have unevenness (i) are less covered with the dielectric layer 15 and (ii) cause electric fields to be easily concentrated on protrusions of the unevenness. This causes leakage to easily occur between the first electrodes and the second electrode via the microfluid.

Generally, the water-repellent layer is not insulating. Thus, insulation of the dielectric layer is important. The dielectric layer which has any slight defect serves as a leak path. This causes a short circuit to occur between the first electrodes and the second electrode via the microfluid, so that the microfluidic device 1 is damaged.

Note, however, that according to the aspect, the first electrodes each of which is made, on the first flattening resin layer 13, of a metal whose surface is smooth can be further covered with the dielectric layer 15. In addition, the first electrodes have no protrusions. This makes it difficult for electric fields to be concentrated in the first electrodes, and therefore makes it difficult for leakage to occur.

In addition, unlike an electrowetting display, the microfluidic device 1 includes no member that blocks external light and is exemplified by a polarizing plate and a color filter. Note, however, that according to the aspect, the plurality of first electrodes, each of which is a light-blocking metal electrode, makes it possible to block external light. Thus, it is possible to make difficult for an off-leakage current to flow through each of the drive elements. This makes it possible to prevent abnormal circuit behaviors such as a malfunction of a drive element which malfunction is caused in a case where the drive element is exposed to external light.

In Aspect 2 of the present invention, a microfluidic device 1 can be arranged such that: in Aspect 1 of the present invention, the plurality of first electrodes is connected to the respective plurality of drive elements via respective contact holes 19 that are provided in the first flattening resin layer 13; and the dielectric layer 15 includes (i) at least one second flattening resin layer 16 that fills the contact holes 19 and (ii) at least one ion barrier layer 17 that is made of an inorganic material.

With the arrangement, the water-repellent layer 18 which is even and dense can be formed in a case where (i) a flattening resin layer is arranged to include at least the following two layers: the first flattening resin layer 13 which covers the drive elements; and the second flattening resin layer 16 with which to fill the contact holes 19, and (ii) the contact holes 19 are filled with the second flattening resin layer 16.

In Aspect 3 of the present invention, a microfluidic device 1 can be arranged such that in Aspect 2 of the present invention, the at least one second flattening resin layer 16 covers the plurality of first electrodes, and the at least one ion barrier layer 17 covers the at least one second flattening resin layer 16.

With the arrangement, the second flattening resin layer 16, which is provided on the first electrodes, allows an increase in insulation against an electrode. This makes it possible to guarantee that the ion barrier layer 17 is insulating.

A resin layer has a property of (i) repelling an ionic liquid such as water and (ii) making it difficult for ions to pass therethrough. Therefore, with the arrangement, it is possible to reinforce leakage resistance of the ion barrier layer 17. This allows the microfluidic device 1 to be more resistant to leakage.

The arrangement can be less strict about conditions for photolithography of the second flattening resin layer 16 than a case where the contact holes 19 are filled with the second flattening resin layer 16 so that a surface of the second flattening resin layer 16 is flush with the surfaces of the first electrodes.

Furthermore, with the arrangement, since the second flattening resin layer 16 covers the plurality of first electrodes, unevenness between the first electrodes can be smoothed. Thus, the arrangement makes it possible to achieve more complete smoothing of a surface of the first substrate, so that greater reliability can be achieved.

In Aspect 4 of the present invention, a microfluidic device 1 can be arranged such that in Aspect 2 of the present invention, the at least one ion barrier layer 17 covers the plurality of first electrodes, and the at least one second flattening resin layer 16 covers the at least one ion barrier layer 17.

With the arrangement, since the second flattening resin layer 16 covers the ion barrier layer 17, which covers the plurality of first electrodes, unevenness between the first electrodes can be smoothed. Thus, the arrangement makes it possible to achieve more complete smoothing of the surface of the first substrate, so that greater reliability can be achieved.

The arrangement makes it possible to prevent the ion barrier layer 17 from having a lower quality due to a gas resulting from degasification of the second flattening resin layer 16.

In Aspect 5 of the present invention, a microfluidic device 1 can be arranged such that: in Aspect 2 of the present invention, the at least one second flattening resin layer 16 fills at least (a) the contact holes 19 of (a) the contact holes 19 and (b) spaces between the plurality of first electrodes, and no second flattening resin layer 16 is provided on the plurality of first electrodes; and the at least one ion barrier layer 17 covers the at least one second flattening resin layer 16 and the plurality of first electrodes.

With the arrangement, since the second flattening resin layer 16 at least (a) the contact holes 19 of (a) the contact holes 19 and (b) spaces between the plurality of first electrodes, and no second flattening resin layer 16 is provided on the plurality of first electrodes, fewer materials can be used, and the array substrate 10 can be made thinner.

In Aspect 6 of the present invention, a microfluidic device 1 can be arranged such that: in any one of Aspects 1 through 5 of the present invention, the electroconductive microfluid is microfluid containing magnetic particles 53, the microfluidic device further including: a magnet 61 for fixing the magnetic particles 53, the plurality of first electrodes each being made of a nonmagnetic metal material.

With the arrangement, in a case where the first electrodes are each made of a nonmagnetic metal material, the microfluidic device 1 which, as described earlier, includes the magnet 61 for fixing the magnetic particles 53 also allows movement of the microfluid, containing the magnetic particles, without being affected by a magnetic field. Thus, the arrangement makes it possible to provide the microfluidic device 1 which (i) allows movement of the microfluid, containing the magnetic particles, without being affected by a magnetic field, (ii) is highly smooth in surface of the water-repellent layer provided above the first electrodes, (iii) makes it easy for the microfluid to move, and (iv) makes it difficult for leakage to occur between the first electrodes and the second electrode via the microfluid.

In Aspect 7 of the present invention, a microfluidic device 1 can be arranged such that: in any one of Aspects 1 through 6 of the present invention, the plurality of first electrodes is each made of molybdenum.

With the arrangement, in a case where the first electrodes are each made of molybdenum, a segment electrode that has a smoother surface than an ITO electrode can be formed. Among metals, molybdenum particularly has a high etching rate during wet etching. Therefore, the first electrodes each of which is made of molybdenum cause tapering of edges of the first electrodes to be gradual. This allows the dielectric layer, which covers the edges of the first electrodes, to further cover the first electrodes.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Microfluidic device
2 Cell
10 Array substrate
11, 41 Insulating substrate
12 Thin film electronic circuit layer
13 First flattening resin layer
14, 14a, 14b, 42 Electrode
15 Dielectric layer
16 Second flattening resin layer
17 Ion barrier layer
18, 43 Water-repellent layer
19 Contact hole
20 TFT (drive element)
21 Gate electrode
22 Gate insulating film
23 Semiconductor layer
24 Source electrode
25 Drain electrode
31 Electrode array
32 Array element
33 Array element circuit
34 Row drive circuit
35 Column drive circuit
36 Serial interface
37 Voltage supply interface
38 Connecting wire
40 Counter substrate
41 Insulating substrate
50 Internal space
51 Droplet (microfluid)
52 Nonionic liquid
53 Magnetic particle
61 Magnet
61S South pole
61N North pole

The invention claimed is:

1. An electrowetting on dielectric (EWOD) device comprising:
a first substrate; and
a second substrate provided so as to face the first substrate,
the first substrate including:
a plurality of first electrodes;
a plurality of drive elements, electrically connected to the respective plurality of first electrodes, for driving the respective plurality of first electrodes;
a first flattening resin layer that covers the plurality of drive elements;
a dielectric layer that covers the plurality of first electrodes; and
a first water-repellent layer that covers the dielectric layer,
the second substrate including:
at least one second electrode provided so as to face the plurality of first electrodes; and
a second water-repellent layer that covers the at least one second electrode,
the first substrate and the second substrate having therebetween an internal space in which to cause an electroconductive microfluid droplet to move across the plurality of first electrodes, wherein the plurality of drive elements are configured to apply different voltages to different first electrodes of the plurality of first electrodes to create a first region and a second region of different hydrophobicity to drive the electroconductive microfluid droplet to move between the first region and the second region across multiple first electrodes of the plurality of first electrodes; and
the plurality of first electrodes being provided on the first flattening resin layer and each being a light-blocking metal electrode that is positioned above the first flattening resin layer to block external light from reaching the drive elements; wherein:
the plurality of first electrodes is connected to the respective plurality of drive elements via respective contact holes that are provided in the first flattening resin layer; and
the dielectric layer includes a second flattening resin layer that fills the contact holes, and the second flattening layer is a discontinuous layer that has no portions outside the contact holes that cover the plurality of first electrodes.

2. The EWOD device as set forth in claim 1, wherein the dielectric layer further includes at least one ion barrier layer that is made of an inorganic material.

3. The EWOD device as set forth in claim 2, wherein the at least one ion barrier layer covers the second flattening resin layer.

4. The EWOD device as set forth in claim 2, wherein the at least one ion barrier layer covers the plurality of first electrodes, and the at least one second flattening resin layer covers the at least one ion barrier layer.

5. The EWOD device as set forth in claim 2, wherein:
the second flattening resin layer fills spaces between the plurality of first electrodes; and
the at least one ion barrier layer covers the second flattening resin layer and the plurality of first electrodes.

6. The EWOD device as set forth in claim 1, wherein:
the electroconductive microfluid is microfluid containing magnetic particles,
said microfluidic device further comprising:
a magnet for fixing the magnetic particles,
the plurality of first electrodes each being made of a nonmagnetic metal material.

7. The EWOD device as set forth in claim 1, wherein the second flattening resin layer fills spaces between the plurality of first electrodes.

8. The EWOD device as set forth in claim 1, wherein the plurality of first electrodes is each a metal electrode formed by wet etching.

9. The EWOD device as set forth in claim 8, wherein the plurality of first electrodes is each made of molybdenum.

10. An electrowetting on dielectric (EWOD) device comprising:
a first substrate; and
a second substrate provided so as to face the first substrate,
the first substrate including:
a segmented electrode layer comprising a plurality of first electrodes;
a plurality of drive elements, electrically connected to the segmented electrode layer for driving the plurality of first electrodes;
a first flattening resin layer that covers the plurality of drive elements;
a dielectric layer that covers the plurality of first electrodes; and
a first water-repellent layer that covers the dielectric layer,
the second substrate including:
at least one second electrode provided so as to face the plurality of first electrodes; and
a second water-repellent layer that covers the at least one second electrode,
the first substrate and the second substrate having therebetween an internal space in which to cause an electroconductive microfluid droplet to move across the segmented electrode layer, wherein the plurality of drive elements are configured to apply different voltages to the segmented electrode layer to create a first region and a second region of different hydrophobicity to drive the electroconductive microfluid droplet to move between the first region and the second region across multiple first electrodes of the plurality of first electrodes; and
the plurality of first electrodes being provided on the first flattening resin layer and each being a light-blocking metal electrode that is positioned above the first flattening resin layer to block external light from reaching the drive elements; wherein:
the plurality of first electrodes is connected to the respective plurality of drive elements via respective contact holes that are provided in the first flattening resin layer; and
the dielectric layer includes a second flattening resin layer that fills the contact holes, and the second flattening layer is a discontinuous layer that has no portions outside the contact holes that cover the plurality of first electrodes.

11. The EWOD device as set forth in claim 10, wherein the plurality of first electrodes of the segmented electrode layer is each a metal electrode formed by wet etching.

12. The EWOD device as set forth in claim 11, wherein the plurality of first electrodes is each made of molybdenum.

* * * * *